(12) United States Patent
Sinykin

(10) Patent No.: US 8,652,289 B2
(45) Date of Patent: *Feb. 18, 2014

(54) METHODS OF MANUFACTURING PAINT ROLLER COVERS FROM A TUBULAR FABRIC SLEEVE

(75) Inventor: Daniel L. Sinykin, Bayside, WI (US)

(73) Assignee: Seamless Technologies, LLC, Janesville, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/495,491

(22) Filed: Jun. 13, 2012

(65) Prior Publication Data

US 2012/0273123 A1    Nov. 1, 2012

Related U.S. Application Data

(63) Continuation of application No. 12/132,774, filed on Jun. 4, 2008, now Pat. No. 8,221,578, which is a continuation-in-part of application No. 11/740,119, filed on Apr. 25, 2007, now Pat. No. 7,503,191, and a continuation-in-part of application No. 12/015,612, filed on Jan. 17, 2008, now Pat. No. 7,905,980, and a continuation-in-part of application No. 12/100,050, filed on Apr. 9, 2008, and a continuation-in-part of application No. 12/116,022, filed on May 6, 2008, now Pat. No. 7,748,241.

(51) Int. Cl.

| B29C 65/00 | (2006.01) |
| B32B 37/00 | (2006.01) |
| B32B 38/04 | (2006.01) |
| C08J 5/00 | (2006.01) |
| B05C 11/00 | (2006.01) |
| B25F 5/00 | (2006.01) |

(52) U.S. Cl.
USPC .......... 156/309.6; 156/86; 156/250; 156/267; 156/294; 492/48

(58) Field of Classification Search
USPC .......... 156/71, 72, 84, 85, 86, 148, 149, 196, 156/198, 212, 213, 229, 293, 294, 303.1; 492/48, 28, 29; 15/230, 230.11
See application file for complete search history.

(56) References Cited

U.S. PATENT DOCUMENTS

| 1,791,741 A | 2/1931 | Moore |
| 1,849,466 A | 3/1932 | Moore |

(Continued)

FOREIGN PATENT DOCUMENTS

| DE | 19824405 | 12/1999 |
| DE | 19824405 A1 * | 12/1999 .............. B05C 17/02 |

(Continued)

*Primary Examiner* — Philip Tucker
*Assistant Examiner* — Brian R Slawski
(74) *Attorney, Agent, or Firm* — Reinhart Boerner Van Deuren s.c.

(57) ABSTRACT

A method of manufacturing paint roller covers is disclosed in which the paint roller covers are manufactured from a seamless, tubular fabric sleeve having a backing or base fabric having pile strands knitted thereinto which pile strands extend outwardly from the base fabric to form the pile of the seamless, tubular fabric sleeve. The seamless, tubular fabric sleeve is placed onto a segment of film wound onto a cylindrical member, and heat is applied to cause the segment of film to fuse with the base fabric to support the seamless, tubular fabric sleeve in a cylindrical configuration. The tubular knitted pile fabric having the segment of film fused thereto may be finished into paint roller covers by combing and shearing the pile fabric to a desired length, beveling the edges of the paint roller covers, and vacuuming stray fibers from the paint roller covers.

25 Claims, 11 Drawing Sheets

(56) References Cited

U.S. PATENT DOCUMENTS

| | | | |
|---|---|---|---|
| 2,600,955 A | 6/1952 | Barnes et al. | |
| 2,630,619 A | 3/1953 | Schmidt et al. | |
| 2,704,877 A | 3/1955 | Schmidt | |
| 2,737,702 A | 3/1956 | Schmidt et al. | |
| 2,752,953 A | 7/1956 | Schmidt | |
| 2,920,372 A | 1/1960 | Sannipoli et al. | |
| 2,944,588 A | 7/1960 | Sannipoli et al. | |
| 3,010,867 A | 11/1961 | Sannipoli et al. | |
| 3,181,233 A | 5/1965 | Sannipoli et al. | |
| 3,226,952 A | 1/1966 | Cassady | |
| 3,299,672 A | 1/1967 | Schmidt | |
| 3,732,135 A | 5/1973 | Ernst et al. | |
| 3,853,680 A | 12/1974 | Daniel | |
| 3,894,407 A | 7/1975 | Clingan et al. | |
| 3,894,409 A | 7/1975 | Clingan et al. | |
| 3,896,637 A | 7/1975 | Thore | |
| 4,236,286 A | 12/1980 | Abler et al. | |
| 4,245,487 A | 1/1981 | Schaab et al. | |
| 4,415,611 A | 11/1983 | Yamagata et al. | |
| 4,466,151 A | 8/1984 | Barch et al. | |
| 4,513,042 A | 4/1985 | Lumb | |
| 4,532,780 A | 8/1985 | Tilson et al. | |
| 4,546,020 A | 10/1985 | Sakai et al. | |
| 4,592,213 A | 6/1986 | Tilson et al. | |
| 4,692,975 A | 9/1987 | Garcia | |
| 4,798,748 A | 1/1989 | Kitamura et al. | |
| 5,206,968 A | 5/1993 | Bower et al. | |
| 5,294,276 A | 3/1994 | Linn et al. | |
| 5,339,484 A | 8/1994 | Polzin et al. | |
| 5,431,029 A | 7/1995 | Kuhrau et al. | |
| 5,537,745 A * | 7/1996 | Musch et al. | 29/895.211 |
| 5,546,768 A | 8/1996 | Kuhrau et al. | |
| 5,572,790 A | 11/1996 | Sekar | |
| 5,577,402 A | 11/1996 | Kuhrau et al. | |
| RE35,526 E | 6/1997 | Alvarez Garcia | |
| 5,685,176 A | 11/1997 | Kuhrau et al. | |
| 5,694,688 A | 12/1997 | Musch et al. | |
| 6,016,670 A | 1/2000 | Kuhrau et al. | |
| 6,151,920 A | 11/2000 | Schindler et al. | |
| 6,159,134 A * | 12/2000 | Sekar | 492/13 |
| 6,159,320 A | 12/2000 | Tams et al. | |
| 6,203,648 B1 | 3/2001 | Barton et al. | |
| 6,324,717 B1 | 12/2001 | Sekar | |
| 6,502,779 B1 | 1/2003 | Jelinek et al. | |
| 6,615,490 B2 | 9/2003 | Polzin | |
| 6,685,121 B1 | 2/2004 | Jelinek | |
| 6,766,668 B2 * | 7/2004 | Sinykin | 66/191 |
| 6,902,131 B1 | 6/2005 | Jelinek | |
| 6,918,552 B2 | 7/2005 | Jelinek | |
| 6,929,203 B1 | 8/2005 | Jelinek | |
| 6,993,941 B2 | 2/2006 | Yamaguchi | |
| 2001/0036513 A1 * | 11/2001 | Capoccia | 427/429 |
| 2002/0042331 A1 | 4/2002 | Fortner et al. | |
| 2002/0091051 A1 | 7/2002 | Sekar | |
| 2002/0104358 A1 | 8/2002 | Hart | |
| 2002/0112810 A1 | 8/2002 | Polzin et al. | |
| 2003/0213083 A1 * | 11/2003 | Yamaguchi | 15/230 |
| 2007/0056132 A1 * | 3/2007 | Yamaguchi et al. | 15/230 |

FOREIGN PATENT DOCUMENTS

| | | | |
|---|---|---|---|
| GB | 2236124 | 3/1991 | |
| GB | 2236124 A * | 3/1991 | A46D 9/00 |
| KR | 1020010074645 | 8/2001 | |

* cited by examiner

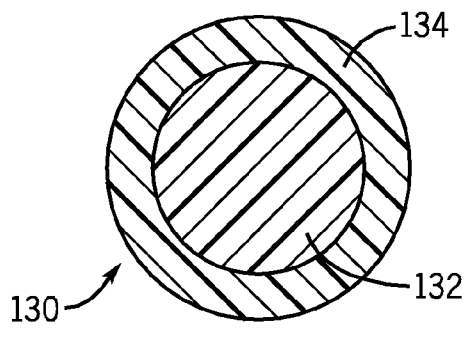
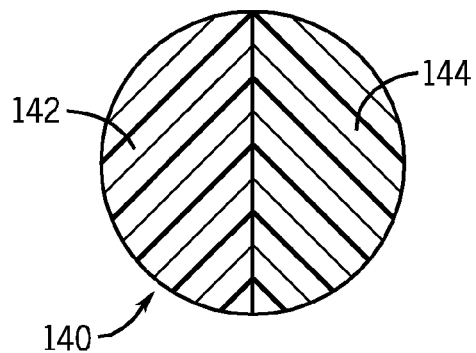
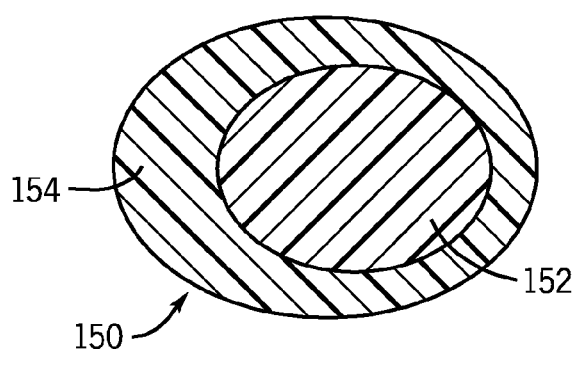
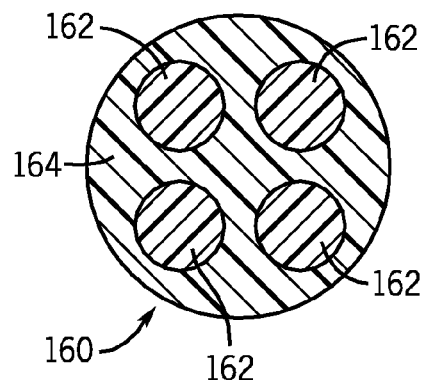
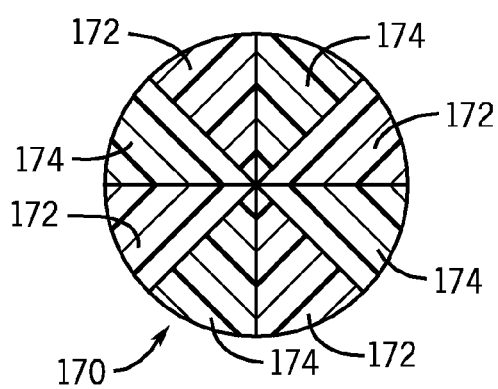
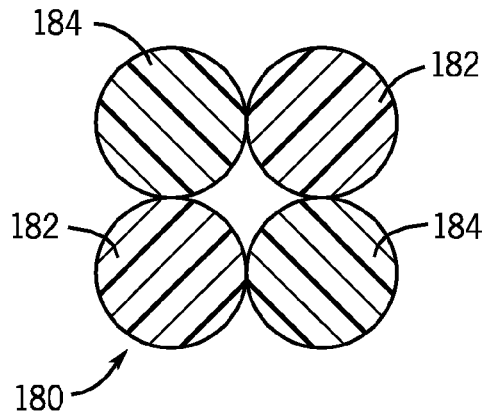

FIG. 11
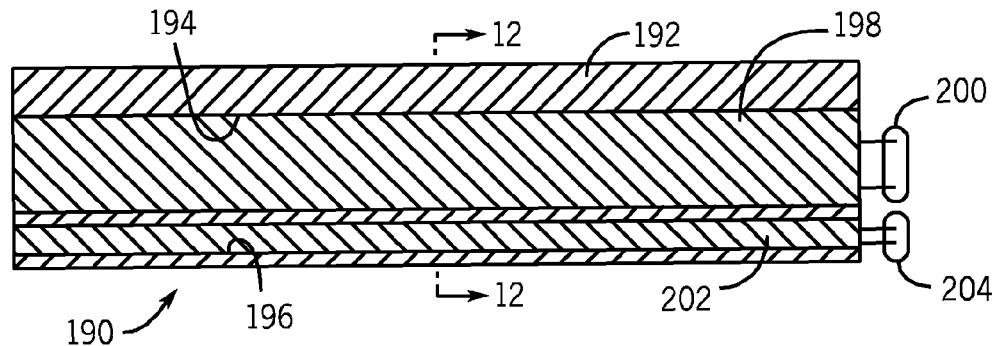
FIG. 12
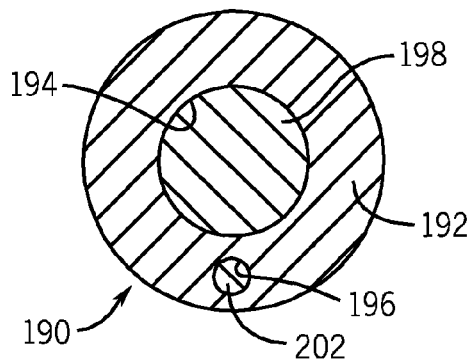
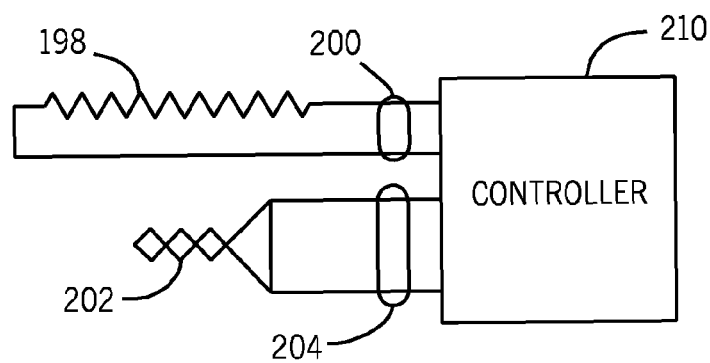
FIG. 13

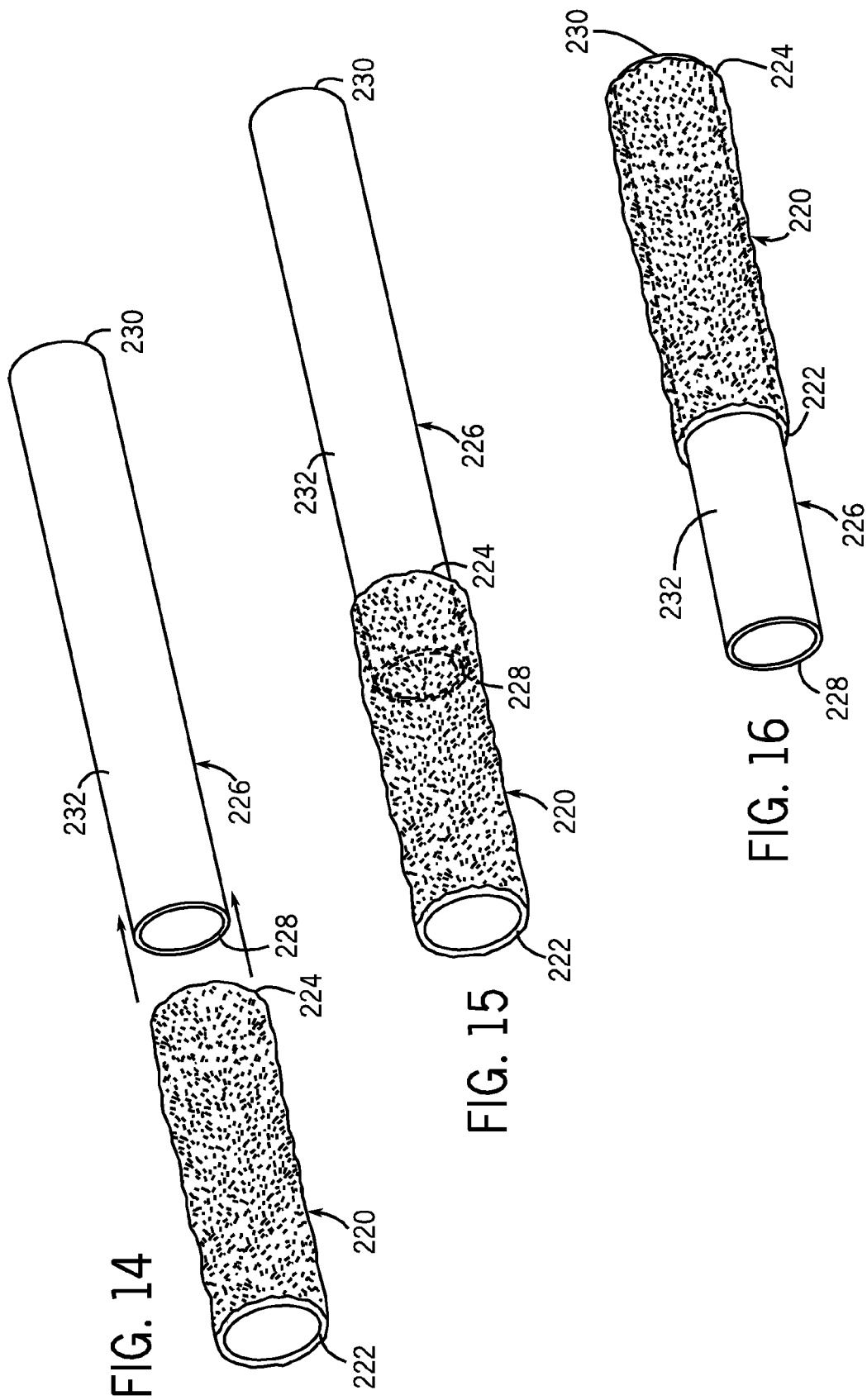

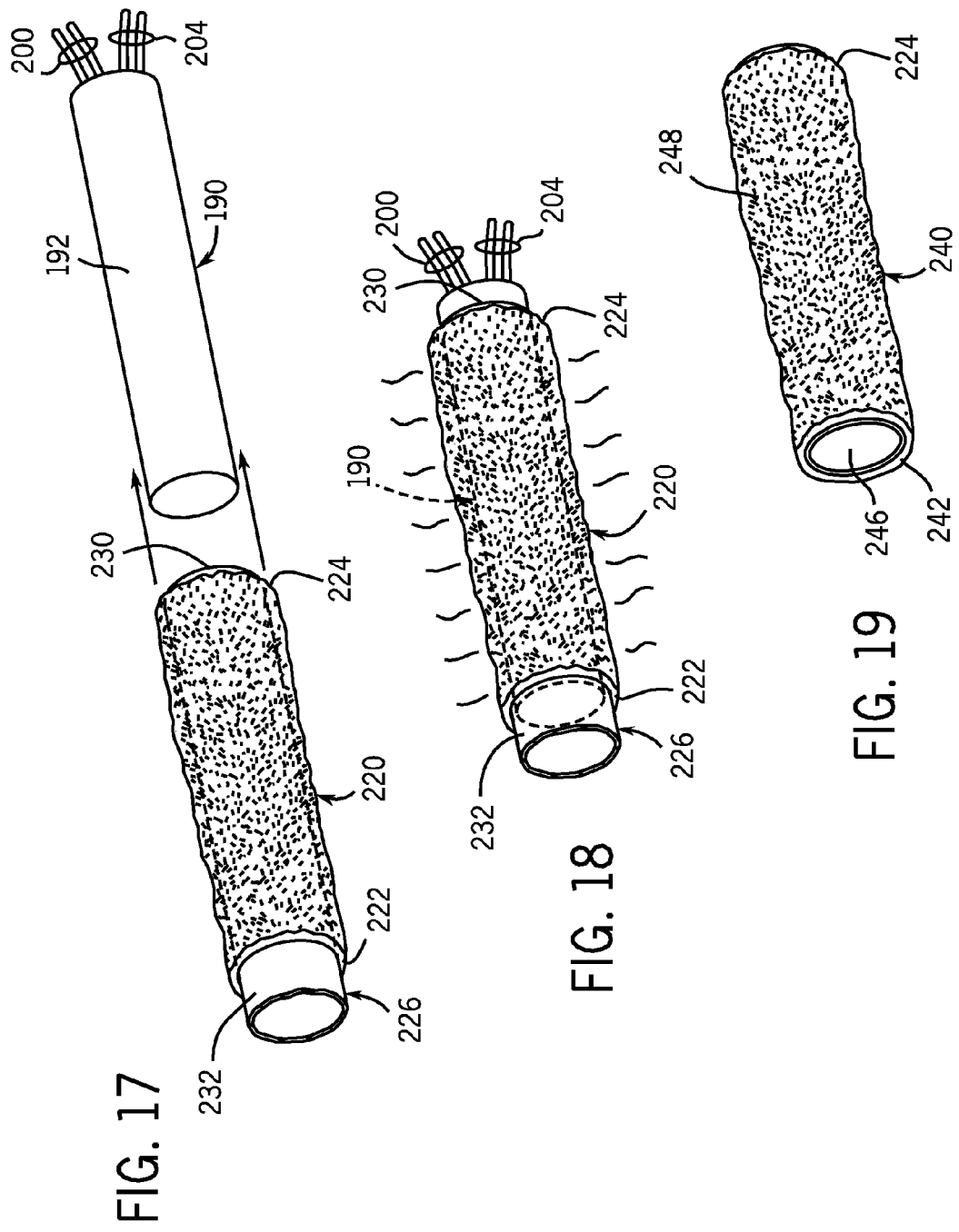

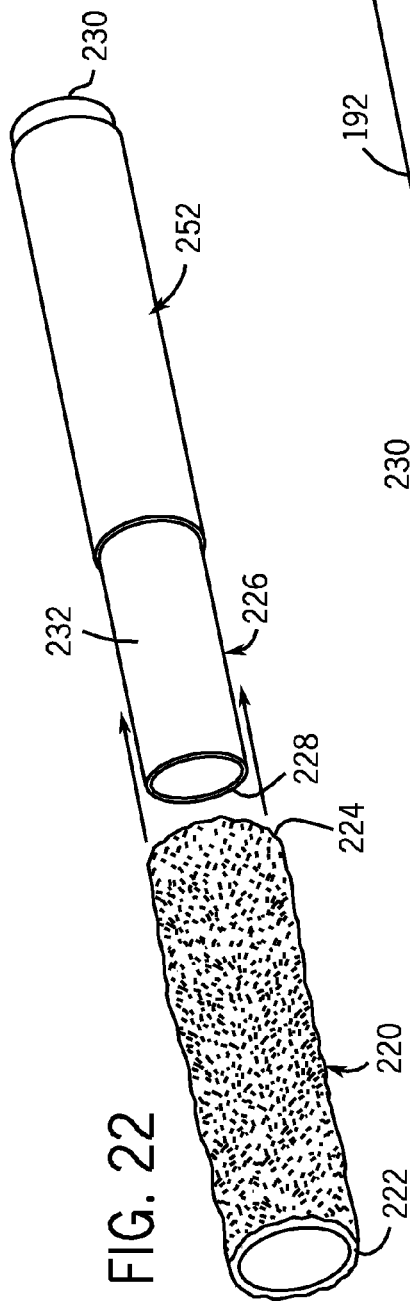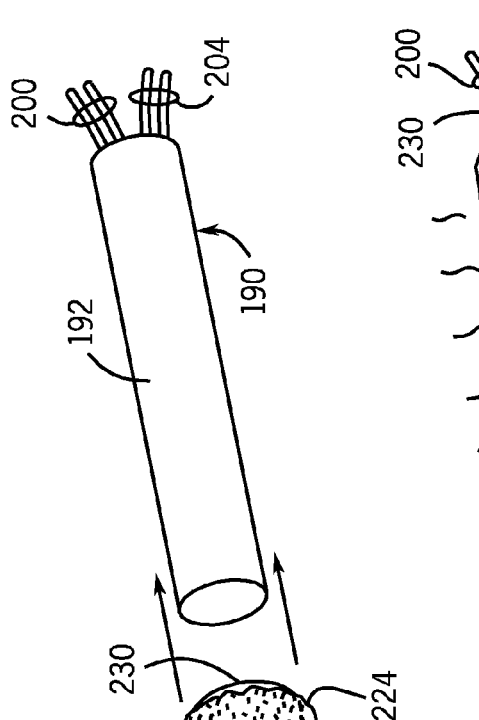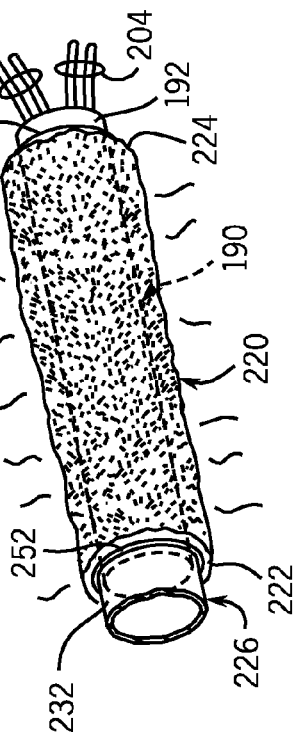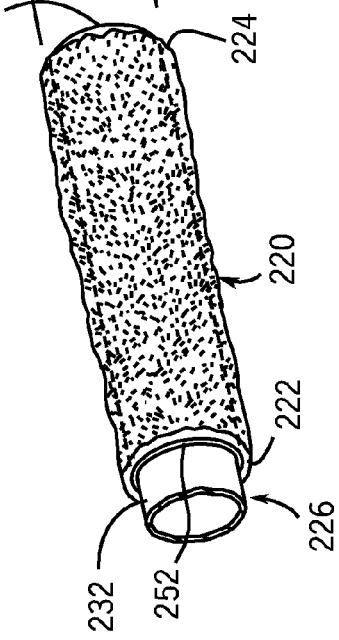

METHODS OF MANUFACTURING PAINT ROLLER COVERS FROM A TUBULAR FABRIC SLEEVE

IDENTIFICATION OF RELATED APPLICATIONS

This patent application is a continuation of U.S. patent application Ser. No. 12/132,774, filed on Jun. 4, 2008, issued as U.S. Pat. No. 8,221,578 on Jul. 17, 2012, entitled "Methods of Manufacturing Paint Roller Covers From a Tubular Fabric Sleeve;" which in turn is a continuation-in-part of U.S. patent application Ser. No. 11/740,119 filed on Apr. 25, 2007, issued as U.S. Pat. No. 7,503,191 on Mar. 17, 2009, entitled "Tubular Sliver Knit Fabric for Paint Roller Covers," and a continuation-in-part of U.S. patent application Ser. No. 12/015,612 filed on Jan. 17, 2008, issued as U.S. Pat. No. 7,905,980 on Mar. 15, 2011, entitled "Method of Manufacturing Paint Roller Covers From a Tubular Fabric Sleeve," and a continuation-in-part of U.S. patent application Ser. No. 12/100,050, filed on Apr. 9, 2008, entitled "Method of Manufacturing Paint Roller Covers From a Tubular Fabric Sleeve," and a continuation-in-part of U.S. patent application Ser. No. 12/116,022 filed on May 6, 2008, issued as U.S. Pat. No. 7,748,241 on Jul. 6, 2010, entitled "Tubular Cut Pile Knit Fabric for Paint Roller Covers," all five of which patents or patent applications are assigned to the assignee of the present invention, and all five of which patents or patent applications are hereby incorporated herein by reference in their entirety.

BACKGROUND OF THE INVENTION

Field of the Invention

The present invention relates generally to the manufacture of paint roller covers, and more particularly to methods of manufacturing paint roller covers from a seamless, tubular fabric sleeve having a segment of film fused with a backing or base fabric of the seamless, tubular fabric sleeve to form a paint roller cover.

The two inventions which have had the greatest impact on paint application are the invention of the paint roller in the 1930's and the development of water-based paint in the late 1940's. While water-based paints are easy to mix, apply, and clean up, there is little doubt that the paint roller has been the greatest single time saving factor in the paint application process, allowing large surfaces to be painted with a uniform coat of paint quickly and easily. Typically, paint rollers are comprised of two components, namely a handle assembly and a paint roller cover for installation onto the handle assembly.

The handle assembly consists of a grip member having a generally L-shaped metal frame extending therefrom, with the free end of the metal frame having a rotatable support for a paint roller cover mounted thereon. The paint roller cover consists of a thin, hollow cylindrical core which fits upon the rotatable support of the handle, with a plush pile fabric being secured to the outer diameter of the paint roller cover. The core may be made of either cardboard or plastic material, with which material is used for the core generally being determined based upon the selling price of the paint roller cover. The pile fabric is traditionally applied as a strip which is helically wound onto the outer surface of the core with adjacent windings of the fabric strip being located close adjacent each other to provide the appearance of a single continuous pile fabric covering on the core.

Typically, the pile fabric is a dense knitted pile fabric, which may be knitted from natural fibers such as wool or mohair, synthetic fibers such as polyester, acrylic, nylon, or rayon, or from a blend of natural and synthetic fibers. The knitting is typically performed on a circular sliver knitting machine, which produces a tubular knitted backing or base material with a knit-in pile in tubular segments which are approximately fifty-eight inches (1473 millimeters) in circumference by thirty to fifty yards (27.43 meters to 45.728 meters) long (depending on fabric weight).

Generally, sliver knitting is a knitting process which locks individual pile fibers directly into a lightweight knit backing or base material in a manner wherein the pile fibers extend from one side of the knit base material. The knit base material itself is made from yarn, which may be knitted in a single jersey circular knitting process on a circular knitting machine, with closely packed U-shaped tufts of the fibers being knitted into the knit base material which anchors them in the completed pile fabric. The free ends of the fibers extend from one side of the knit base material to provide a deep pile face. The knit base material is typically made of synthetic yarns, with the pile being made of a desired natural or synthetic fiber, or a blend of different fibers.

Such fabrics are illustrated, for example, in U.S. Pat. No. 1,791,741, to Moore, U.S. Pat. No. 2,737,702, to Schmidt et al., U.S. Pat. No. 3,226,952, to Cassady, U.S. Pat. No. 3,853,680, to Daniel, U.S. Pat. No. 3,894,409, to Clingan et al., U.S. Pat. No. 4,236,286, to Abler et al., U.S. Pat. No. 4,513,042, to Lumb, and U.S. Pat. No. 6,766,668, to Sinykin, all of which patents are hereby incorporated herein by reference. Sliver knit high pile fabrics have been widely used for many years in the manufacture of imitation fur fabrics, and also have found use, for example, as linings for overcoats and footwear, as coverings for stuffed toys and floors, in applications in pet beds, case liners, boot and slipper liners, medical pads, and blankets, and, of course, as coverings for paint roller covers.

The components of the knitted fabric are a yarn, which is used to knit the fabric's knit base material, and fibers which are supplied in a "sliver" rope, which consists of fibers which are all longitudinally oriented in a rope which is typically less than three inches (76 millimeters) in diameter. The fibers are loose fibers of either a single type or a uniform blend of multiple types of fibers. The fiber mix will determine the performance, density, texture, weight, patterning, and color of the finished pile fabric.

The fibers are typically blown together in an air chamber to blend them, and then are carded in carding machines that "comb" the fibers to align them in parallel with each other. The fibers are then gathered into a soft, thick rope which is called "sliver" (which is the derivation for the term "sliver knit") or "roving." The yarn and the sliver are supplied to the circular knitting machine, which typically has eighteen heads and produces a tubular knit pile fabric which is approximately fifty-eight inches (1473 millimeters) in circumference. (Thus, when the tubular knit pile fabric is slit longitudinally, the fabric is approximately fifty-eight inches (1473 millimeters) wide.)

Such knitting machines are well known in the art, and are illustrated in U.S. Pat. No. 3,894,407, to Clingan et al., U.S. Pat. No. 3,896,637, to Thore, U.S. Pat. Nos. 4,532,780 and 4,592,213, both to Tilson et al., U.S. Pat. Nos. 5,431,029, 5,546,768, 5,577,402, 5,685,176, and 6,016,670, all to Kukrau et al., and U.S. Pat. No. 6,151,920, to Schindler et al., all of which patents are hereby incorporated herein by reference. Examples of commercial versions of such knitting machines are the Model SK-18 II Sliver Knitter and the Model SK-18J II Sliver Knitter which are available from Mayer Industries, Inc. of Orangeburg, S.C.

The first commercial circular sliver knitting machine had seven heads, and commercially-available circular knitting machines today have between seven and eighteen heads. Eighteen head knitting machines have upwards of one thousand needles, and produce tubular knitted segments that are approximately nineteen inches (483 millimeters) in diameter (fifty-eight inches (1473 millimeters) in circumference). All of these circular sliver knitting machines produce tubular knitted pile fabric segments having the pile located on the inside. Such circular sliver knitting machines are incapable of either producing tubular knitted pile fabric segments having the pile on the outside or small diameter tubular knitted pile fabric segments.

Following the manufacture of the tubular knitted pile segments on a circular sliver knitting machine, the tubular knitted pile segments are slit longitudinally to produce extended knitted pile segments of fabric which are typically fifty-eight inches (1473 millimeters) wide by thirty to fifty yards (27.43 meters to 45.728 meters) long. These extended knitted pile segments of fabric are then tensioned longitudinally and transversely, stretched to a sixty inch (1524 millimeter) width or greater to guarantee the proper number of two and seven-eighth inch (73 millimeter) strips, and back coated (on the non-pile side of the knit base material) with a stabilized coating composition such as a clear acrylic polymer. The coating composition which is coated onto the non-pile side of the knit base material is then processed, typically by heat, to stabilize the coated, extended knitted pile segment. The heating operation dries and bonds the coating composition to the knit base material, producing a fabric which is essentially lint-free.

The coated, extended knitted pile segment can then be subjected to a shearing operation to achieve a uniform pile length, with the sheared fibers being removed by vacuum, electrostatically, or by any other known removal technique. The pile density, the nap length, and the stiffness of the fibers are varied based upon custom specifications and the particular characteristics of the paint roller cover that are desired.

The sheared, coated, extended knitted pile segment is then slit into a plurality of two and seven-eighths inch (73 millimeter) wide knitted pile fabric strips, of which there are typically twenty for a sixty inch (1524 millimeter) wide fabric segment. During this slitting operation, the strips may be vacuumed to remove stray fibers and lint. The knitted pile fabric strips are rolled onto a core to produce twenty rolls of knitted pile fabric strips, each of which is thirty to fifty yards long. These rolls of knitted pile fabric strips may then be shipped to a paint roller cover manufacturer. Alternately, a plurality of standard lengths of the fabric may be seamed together to produce an extended length fabric strip which may be helically wound in consecutive rows upon a core as taught in U.S. Pat. No. 6,502,779, U.S. Pat. No. 6,685,121, U.S. Pat. No. 6,902,131, U.S. Pat. No. 6,918,552, and U.S. Pat. No. 6,929,203, all to Jelinek et al., all of which patents are hereby incorporated herein by reference.

Both the standard length rolls of knitted pile fabric strips and the rolls of extended length knitted pile fabric strips have substantial material costs and labor costs that are incurred in the manufacturing process after the circular knitting process. The material costs include the cost of the coating material, losses due to fly (fly are extra fibers that come loose from the knitted pile fabric), losses during the cutting of the sixty inch (1524 millimeter) wide fabric segment into twenty knitted pile fabric strips, and seam losses throughout the operation. The labor costs include the costs to perform the coating process, the brushing, the second pass shearing, and all of the finishing steps within the traditional sliver knit operation including slitting and continuously coiling the fabric slits.

Paint roller covers are manufactured by using a hollow cylindrical core made of cardboard or thermoplastic material which has the knitted pile fabric strip helically wound around the core. During the manufacture of paint roller covers, the knitted pile fabric strips are secured to the core either by using adhesive or epoxy, or by thermally bonding the knitted pile fabric strip in place on a thermoplastic core. For examples of these manufacturing processes see U.S. Pat. No. 4,692,975, to Garcia (the "'975 Patent"), U.S. Pat. No. 5,572,790, to Sekar (the "'790 Patent"), and U.S. Pat. No. 6,159,320, to Tams et al. (the "'320 Patent"), each of which are hereby incorporated by reference.

The '975 Patent uses a core that is cut from preformed thermoplastic (e.g., polypropylene) tubular stock. The core is mounted on a rotating spindle, and a movable carriage mounted at an angle to the spindle feeds a continuous strip of knitted pile fabric onto the core, with the carriage moving parallel to the spindle in timed relation to its rotation so that the knitted pile fabric strip is wound on the plastic core in a tight helix. Also mounted to the movable carriage is a heat source for heat softening the thermoplastic core just in advance of the point where the knitted pile fabric strip is applied to the thermoplastic core, such that the knitted pile fabric is heat bonded to the thermoplastic core as it is wound thereupon. The bond formed between the knitted pile fabric and the thermoplastic core is a strong one not subject to separation from exposure to paint solvents.

The '790 Patent uses a core that is formed from a strip (or multiple strips) of thermoplastic material that is (are) helically wound about a stationary mandrel. Alternately, the core may be formed by applying liquefied thermoplastic material to a drive belt which transfers the thermoplastic material to the mandrel. A layer of adhesive is then applied to the outer surface of the core, and the knitted pile fabric strip is applied to the core by helically winding the knitted pile fabric strip onto the core. Alternately, the paint roller cover may instead be made by bonding, in a single step, a knitted pile fabric strip to a wound strip of thermoplastic material that is wrapped about the mandrel.

The '320 Patent extrudes a cylindrical plastic core through a rotating extruder head that is cooled, with the outer surface of the core then being plasma treated. The knitted pile fabric strip is secured onto the plasma treated outer surface of the core by extruding thin films of first and second epoxy resin subcomponents onto the outer surface of the core as it is extruded, cooled, and plasma treated in a continuous process.

Other variations are also known, particularly in technologies relating to manufacturing pile fabric suitable for use on paint roller covers. For example, instead of using knitted pile fabric, woven pile fabric can be substituted. Woven pile fabric consists of three yarns—a knit base material or warp yarn, a filling or weft yarn, and a pile yarn. The threads of warp yarn are held taut and in a parallel array on a loom, and the threads of weft yarn are woven across the threads of warp yarn in an over/under sequence orthogonal to the threads of warp yarn, with threads of pile yarn being woven into the weave of warp and weft yarns such that the threads of pile yarn extend essentially perpendicularly from one side of the fabric. Such woven pile fabric may be processed in a manner similar to that described above with regard to the processing of knitted pile segments of fabric to produce strips of woven pile fabric that can be helically wound onto paint roller cover cores.

However, all paint roller covers manufactured using the methods described above have a seam. As the strips of fabric are helically wound around the cores, the fabric strips wrap contiguously around the core, thereby creating a helical seam that is located throughout the cover. The seam inevitably produces a less than optimal paint roller cover since a seam can interfere with the uniform application of paint from the paint roller cover. The helical winding process of manufacturing a paint roller cover requires careful attention to contiguous winding. Errors resulting in overlapped fabric or gaps in the contiguous winding process often occur, resulting in increased scrap or marketing poor quality covers. Such seams have the potential, particularly with short nap paint roller covers, to produce a seam mark or stippling effect on the surface being painted, particularly if the paint being applied combines with the seams to produce a more pronounced defective characteristic in the surface being painted.

An examination of prior technology in the paint roller cover arts reveals that this problem has been recognized in the past, with several solutions that have been proposed to deal with the challenge presented by the presence of seams in paint roller covers. The first of these, U.S. Pat. No. 2,600,955, to Barnes et al., which patent is hereby incorporated herein by reference, discloses a paint roller cover made from a segment of canvas tubing that has yarn loops sewn therethrough, with the ends of the loops on the outside of the segment of the canvas tubing being cut. This approach is certainly far too expensive to represent a viable solution, and would not compare well to currently commercially available paint roller covers in the quality of the paint coat that could be applied.

Another approach is shown in U.S. Pat. No. 2,704,877 and U.S. Pat. No. 2,752,953, both to Arnold Schmidt, which patents are hereby incorporated herein by reference, which patents are related and disclose a tubular knitted pile fabric that is stated to have been manufactured on an apparatus disclosed in U.S. Pat. No. 1,849,466, to Moore, which patent is hereby incorporated herein by reference. The apparatus disclosed in Moore, which is hand operated, was stated in several related patents to Sannipoli et al. (U.S. Pat. No. 2,920,372, U.S. Pat. No. 2,944,588, and U.S. Pat. No. 3,010,867, which patents are hereby incorporated herein by reference) to be capable of manufacturing a seamless tubular knitted sleeve in which the pile is located on the interior of the sleeve, thereby requiring that the sleeve be inverted prior to mounting it on a core to form a paint roller cover. As such, the apparatus disclosed in Moore is incapable of manufacturing a knitted sleeve in which the pile is located on the exterior of the sleeve.

The Sannipoli et al. patents inverted the tubular knitted sleeve by positioning it within a hollow tube and pulling one end of the tubular knitted sleeve around the end of the tube and pushing successive portions of the tubular knitted sleeve along the outside of the tube. The Arnold Schmidt '877 patent (which failed to disclose how it inverted the knitted sleeve with the pile on the interior thereof) disclosed a machine for treating and shearing inverted tubular knitted sleeves, and the Arnold Schmidt '953 Patent disclosed using the inverted, treated, and sheared tubular knitted sleeves by stretching them and pulling them over a tube or shell to form a paint roller.

The problem that has prevented the inventions of the Arnold Schmidt patents and the Sannipoli et al. patents from being either practical or commercially successful is that the process of inverting a tubular knitted sleeve having the pile on the interior of the sleeve inevitably damages the fabric of the tubular knitted sleeve. When the fabric is inverted, the material of the fabric is deformed due to stretching that occurs during the process of inverting the tubular knitted sleeve. This deformation tends to increase the diameter of the tubular knitted sleeve, thus requiring it to be stretched lengthwise to restore it to its former diameter. Not only is this process difficult and expensive, but it also results in variable density of the fabric as well as introducing the prospect of adhesive or thermoplastic bleed-through within the stitches. Such problems will result in unacceptable product quality in paint roller covers made from this type of fabric.

It has been determined that the inverting approach taught by the Sannipoli et al. patents and useable by the Arnold Schmidt patents has three drawbacks that make it impracticable. The first drawback of the inverting method is that it requires a high degree of manual operation in that it requires cutting of the tubular knitted sleeves to size and placement of the tubular knitted sleeves into the tubes of the inverting machine. The second drawback of the Sannipoli et al. method is that only relatively short length tubular knitted sleeves representing a single paint roller cover (typically nine inches (229 millimeters)) can be processed at a time, which makes the method inherently unsuitable for mass production.

The third, and by far the most serious, drawback of the Sannipoli et al. method is that the process of inverting the tubular knitted sleeves inevitably results in stretching the tubular knitted sleeves so that they will not snugly fit on the paint roller cover cores, potentially creating creases in a high percentage of them when they are adhesively secured to the paint roller cover cores. This results in an unacceptably high percentage of them being defective and necessitating them being scrapped, resulting in an unacceptably high scrap cost. Predictably, the inventions taught in the Sannipoli et al. patents and the Arnold Schmidt patents have never found commercial acceptance due to these serious disadvantages.

The above-incorporated by reference U.S. Pat. No. 7,503, 191 discloses a tubular sliver knitted pile fabric which is manufactured with the sliver pile side facing outwardly rather than inwardly and with a diameter suitable for mounting on a paint roller cover core in a seamless manner. The above-incorporated by reference U.S. Pat. No. 7,748,241 discloses a tubular knit fabric which is manufactured with a cut pile made of yarn which pile faces outwardly rather than inwardly and with a diameter suitable for mounting on a paint roller cover core in a seamless manner.

The above-incorporated by reference U.S. Pat. No. 7,905, 980 discloses a method of manufacturing paint roller covers from the tubular knitted pile fabric sleeve by initially placing the tubular knitted pile fabric sleeve upon the outside of a thin hollow cylindrical mounting tube, providing an adhesive bonding material on the exterior surface of a core member, and inserting the core member into the interior of the mounting tube. By withdrawing the mounting tube from the knitted pile fabric sleeve while maintaining the respective positions of the knitted pile fabric sleeve and the core member, the knitted pile fabric sleeve is installed onto the exterior surface of the core member and retained thereupon by the adhesive bonding material. The pile fabric covered core member is then finished into paint roller covers by cutting it to a desired size, combing and shearing the pile fabric to a desired length, beveling the edges of the paint roller covers, and vacuuming stray fibers from the paint roller covers.

The above-incorporated by reference U.S. Pat. No. 7,748, 241 discloses a method of manufacturing paint roller covers from either of the tubular knitted pile fabric sleeves described above by providing an adhesive bonding material that has a relatively non-tacky outer surface on the exterior surface the outside of the core member. The knitted pile fabric sleeve is installed onto the exterior surface of the core member over the adhesive bonding material. The adhesive bonding material is then rendered tacky, whereupon the knitted pile fabric sleeve becomes adhesively secured by the adhesive bonding material to the exterior surface of the core member. The pile fabric covered core member may be finished into paint roller covers by combing and shearing the pile fabric to a desired length, beveling the edges of the paint roller covers, and vacuuming stray fibers from the paint roller covers.

While these methods of installing tubular knitted pile fabric sleeves onto core members have been found to be quite satisfactory, it is desirable to provide still other methods by which a paint roller cover may be manufactured from a tubular pile fabric. It is further desirable that the knitted pile fabric need not be stretched during the manufacturing process, and that the manufacturing process ensure that the knitted pile fabric will not have any wrinkles or other surface defects introduced therein during the manufacturing process. It is also desirable that the tubular pile fabric, which is manufactured with the pile side out, need not be inverted during the process of manufacturing a paint roller cover from the tubular pile fabric.

It is highly desirable that the manufacturing method results in an acceptable pile which extends from an acceptably rigid core that can be installed on and used with any conventional paint roller frame. In order to facilitate the mass manufacture of paint roller covers, it is also desirable that the method facilitate either the manufacture of a paint roller cover of a desired finished length, or the manufacture of an extended length segment from which can be cut segments of any desired size for finishing as paint roller covers. It is also desirable that both tubular sliver knitted pile fabric and tubular knitted yarn cut pile fabric as well as a number of different backing materials can be used in the manufacture of paint roller covers.

The method used to manufacture a paint roller cover from the tubular pile fabric must result in a construction which is both durable and long lasting, and which, when accomplished, should yield a paint roller cover of superior quality. In order to enhance the market appeal of the method of the present invention, it should also minimize the cost of manufacture of paint roller covers when compared to conventional methods of manufacturing paint roller covers to thereby afford it the broadest possible market. Finally, it is also desirable that all of the aforesaid advantages and aspirations of the paint roller cover manufacturing method of the present invention be achieved without incurring any substantial relative disadvantage.

SUMMARY OF THE INVENTION

The disadvantages and limitations of the background art discussed above are overcome by the present invention. With this invention, a method of manufacturing paint roller covers is provided which forms a substantially rigid core for the paint roller cover from the knit base material of a tubular knitted pile fabric segment, which knit base material is knitted from a backing yarn. The pile of the tubular knitted pile fabric segment is outwardly facing as the tubular knitted pile fabric segment is knitted, and the pile may be either sliver fibers or cut pile segments formed from a pile yarn. Optionally, the backing yarn used to fashion the knit base material of the tubular knitted pile fabric segment may be a special kind of yarn made from bicomponent fibers.

Bicomponent fibers are comprised of two polymers that have different chemical and/or physical properties and which are extruded from the same extrusion device with both polymers contained within the same fiber. Most commercially available bicomponent fibers are configured with their two constituent polymers arranged either in a sheath-core arrangement, a side-by-side arrangement (also referred to as a bilateral arrangement), an eccentric sheath-core arrangement (which is a geometric variation of sheath-core construction), a matrix-fibril arrangement (also referred to as an inlands-in-the-sea arrangement), and a segmented pie arrangement (also referred to as a citrus arrangement). The bicomponent fibers used by the present invention are "low melt" bicomponent thermal binder fibers that utilize polymer combinations such as a sheath-core arrangement in which the core material has a relatively higher melting point that the sheath material. These alternatives are examples, since many other low-melt configurations can also be manufactured.

Such low melt bicomponent fibers are available from Fiber Innovation Technology, Inc. of Johnson City, Tenn., and from Kuraray Co., Ltd, of Tokyo, Japan. Typical higher melt (which may be used in a core) materials are polyester (most preferred) or polypropylene, and typical sheath materials are polyethylene terephthalate (PET, most preferred), polyethylene, and copolyester. Typical lower melt (which may be used in a sheath) melting points of bicomponent fibers may be between approximately 121 and 260 degrees Centigrade (between 250 and 500 degrees Fahrenheit).

The base or backing yarn used by the present invention may thus optionally be made of such low melt bicomponent fibers; such yarn shall be referred to herein as "bicomponent fiber yarn." Also optionally, the backing yarn may instead be a bicomponent yarn which is made of two different types of fibers or yarns (yarns can be manufactured using different types of fibers or ring spun with two different types of yarn), one of which fiber or yarn types has a lower melting point than the other fiber or yarn type; this yarn shall be referred to herein as "bicomponent yarn." The bicomponent fiber yarn and the bicomponent yarn shall collectively be referred to herein as "low melt yarns." The linear mass density of the backing yarn used by the present invention may vary between approximately 150 denier and approximately 1500 denier, with a preferred linear mass density being between approximately 560 denier and approximately 1100 denier.

The use of low melt yarns for the base of a sliver knit fabric is discussed in U.S. Pat. No. 6,766,668, to Sinykin, which patent is assigned to the assignee of the present invention, and which patent is hereby incorporated herein by reference in its entirety. This patent used heat to activate the low melt material in the base, heating the sliver knit fabric to a temperature for a sufficient period of time to permit the low melt material to melt about the central and/or intermediate portions of the sliver fibers. The sliver knit fabric was then cooled so that the low melt material returned to a hardened state and captured a portion of the sliver fibers to lock them to the base of the fabric. This represents a substantially different use of bicomponent fibers than that made by the present invention, as will become evident below.

The low melt yarn together with either the sliver fibers or cut pile segments formed from a pile yarn (or both) are knitted into the tubular knitted pile fabric segment. The manufacture of a tubular knitted pile fabric with sliver fibers is disclosed in the above-incorporated by reference U.S. Pat. No. 7,503,191, which produces a tubular knitted sliver pile fabric with the pile side facing outwardly and with a diameter suitable for conversion into a paint roller cover (paint roller covers typically have an inner diameter of approximately one and one-half inches (38 millimeters)). The manufacture of a tubular knitted pile fabric with cut pile segments formed from a pile yarn is disclosed in the above-incorporated by reference U.S. Pat. No. 7,748,241, which produces a tubular knitted cut pile fabric with the pile side facing outwardly and with a diameter suitable for conversion into a paint roller cover (paint roller covers typically have an inner diameter of approximately one and one-half inches (38 millimeters)). Alternately, either of the tubular knitted pile fabric segments could be either slightly larger or slightly smaller than the inner diameter of a paint roller cover.

The tubular knitted pile fabric is then placed onto a cylindrical mandrel which is the approximate size of the inner diameter of a paint roller cover (typically approximately one and one-half inches (38 millimeters)). The cylindrical mandrel may be made, for example, of steel (which may optionally have a non-stick coating such as PTFE or silicone) and has a heating mechanism contained inside which is capable of rapidly heating the outside of the mandrel to a desired temperature. The cylindrical mandrel is heated to the desired temperature, which is less than 343 degrees Centigrade (less than 650 degrees Fahrenheit) or any temperature suitable for activating the low melt yarn. One temperature range that may be acceptable is between approximately 190 and 218 degrees Centigrade (between 375 and 425 degrees Fahrenheit). This temperature is sufficient to melt the lower melting point component of the low melt yarn used in the backing or base of the tubular knitted pile fabric, and is maintained for a period of between approximately five seconds and approximately ninety seconds, preferably approximately five to approximately sixty seconds.

The melted lower melting point component of the low melt yarn used in the backing or base of the tubular knitted pile fabric flows into the cylindrical form of the outside of the cylindrical mandrel. The melted lower melting point component also flows between the backing loops and the central and/or intermediate portions of the sliver fibers or the loops of the cut pile yarn segments, and locks the sliver fibers or cut pile yarn segments into the tubular knitted pile fabric. This greatly reducing the degree of shedding of pile fibers from the tubular knitted pile fabric. It also converts the backing from a fabric into a unitary cylindrical assembly which, when cooled, will become substantially rigid. The mandrel is then cooled or allowed to cool, after which the rigid, cylindrical pile fabric assembly is removed from the mandrel.

In the preferred embodiment, one or more layers of a dry adhesive film are first wound on a non-stick mandrel, following which the tubular knitted pile fabric segment is placed over the dry adhesive film. The mandrel is then heated to cause the dry adhesive film and, optionally, the lower melting point component of the low melt yarn used in the backing or base of the tubular knitted pile fabric to melt together with the adhesive bonding material to create an even more rigid cylindrical assembly having a pile surface.

The rigid, cylindrical pile fabric assembly is finished by combing and shearing the pile fabric to the desired length. The edges of the unfinished paint roller covers are beveled, and any loose sliver fibers are then vacuumed off. The finishing of the rigid, cylindrical pile fabric assembly may be performed using the MBK Maschinenbau GmbH paint roller cover finishing machine, an Edward Jackson (Engineer) Limited finishing machine, or other equipment custom built by individual paint roller cover manufacturers.

It may therefore be seen that the present invention teaches a method by which a paint roller cover may be manufactured from tubular knitted pile fabric. Further, in practicing the paint roller cover manufacturing method of the present invention, the tubular knitted pile fabric need not be stretched, and no wrinkles or other surface defects are introduced into the tubular knitted pile fabric during the manufacturing process. Still further, the paint roller cover manufacturing method of the present invention, which manufactures the tubular knitted pile fabric with the pile side out, does not require the tubular knitted pile fabric to be inverted during the manufacturing process.

The paint roller cover manufacturing method of the present invention results in an acceptable pile which extends from an acceptably rigid core which can be installed on and used with any conventional paint roller frame, or on a frame uniquely designed for the paint roller utilizing the new core design. The paint roller cover manufacturing method of the present invention facilitates either the manufacture of a paint roller cover of a desired finished length, or the manufacture of an extended length segment from which segments of any desired size can be cut for finishing as paint roller covers, thereby facilitating the mass manufacture of paint roller covers. The paint roller cover manufacturing method of the present invention can use either tubular sliver knitted pile fabric or tubular knitted yarn cut pile fabric as well as a number of different backing materials.

The paint roller cover manufacturing method of the present invention results in a construction which is both durable and long lasting, and yields a paint roller cover of superior quality. The paint roller cover manufacturing method of the present invention also reduces the cost of manufacturing paint roller covers when compared to conventional methods of manufacturing paint roller covers by manufacturing paint rollers without using a core member, thereby affording it the broadest possible market. Finally, all of the aforesaid advantages and aspirations of the paint roller cover manufacturing method of the present invention are achieved without incurring any substantial relative disadvantage.

DESCRIPTION OF THE DRAWINGS

These and other advantages of the present invention are best understood with reference to the drawings, in which:

FIG. 5 is a cross sectional view of a sheath-core bicomponent fiber having a core made of a material that has a higher melting point than the material that its sheath is made of;

FIG. 6 is a cross sectional view of a side-by-side bicomponent fiber showing opposite sides that are respectively made of materials having different melting points;

FIG. 7 is a cross sectional view of an eccentric sheath-core bicomponent fiber having a core made of a material that has a higher melting point than the material that its sheath;

FIG. 8 is a cross sectional view of a matrix-fibril bicomponent fiber having a plurality of segments made of a material that has a higher melting point located within a sheath that is made of a lower melting point material;

FIG. 9 is a cross sectional view of a segmented pie bicomponent fiber having alternating wedges made of materials having different melting points;

FIG. 10 is a cross sectional view of a bicomponent yarn showing two different types of fibers, one of which fiber types has a lower melting point than the other fiber type;

FIG. 11 is a longitudinal cross sectional view of a mandrel heating assembly having a cartridge heater and a thermocouple located inside a cylindrical mandrel;

FIG. 12 is a lateral cross sectional view of the mandrel heating assembly shown in FIG. 11;

FIG. 13 is a schematic depiction of a controller that uses the signal from the thermocouple illustrated in FIG. 11 to control the cartridge heater also illustrated in FIG. 11;

FIG. 14 is a schematic isometric depiction showing an end of a tubular knitted pile fabric about to be slid onto an outer non-stick surface of a hollow cylindrical aluminum heating tube;

FIG. 15 is a schematic isometric depiction of the tubular knitted pile fabric illustrated in FIG. 14, with the tubular knitted pile fabric being partially slid onto the outer non-stick surface of the aluminum heating tube;

FIG. 16 is a schematic isometric depiction of the tubular knitted pile fabric illustrated in FIGS. 14 and 15, with the tubular knitted pile fabric now located upon the outer non-stick surface of the aluminum heating tube;

FIG. 17 is a schematic isometric depiction of the tubular knitted pile fabric and the outer non-stick surface of the aluminum heating tube illustrated in FIGS. 14 through 16 about to be slid onto the mandrel heating assembly;

FIG. 18 is a schematic isometric depiction of the tubular knitted pile fabric and the outer non-stick surface of the aluminum heating tube illustrated in FIGS. 14 through 17 located upon the mandrel heating assembly illustrated in FIG. 17 and being heated;

FIG. 19 is a schematic isometric depiction of the tubular knitted pile fabric that was heated on the aluminum heating tube and the mandrel heating assembly illustrated in FIGS. 17 and 18 with the backing fused into a rigid cylindrical configuration;

FIG. 22 is a schematic isometric depiction showing an end of a tubular knitted pile fabric about to be slid onto the one or more windings of dry adhesive film on the aluminum heating tube shown in FIG. 21;

FIG. 23 is a schematic isometric depiction of the tubular knitted pile fabric, the one or more windings of dry adhesive film, and the aluminum heating tube illustrated in FIG. 22 about to be slid onto the mandrel heating assembly;

FIG. 24 is a schematic isometric depiction of the tubular knitted pile fabric, the one or more windings of dry adhesive film, and the aluminum heating tube illustrated in FIGS. 22 and 23 located upon the mandrel heating assembly illustrated in FIG. 23 and being heated.

DETAILED DESCRIPTION OF THE PREFERRED EMBODIMENTS

Figure 1:
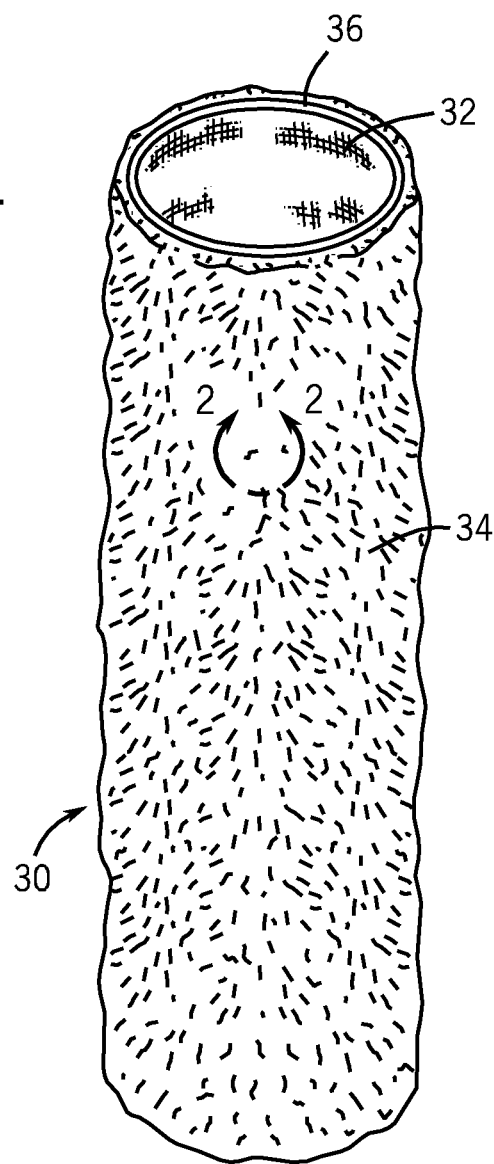
FIG. 1 is an isometric view of a segment of tubular paint roller fabric made according to the teachings of the present invention with the pile extending outwardly, showing a tubular knit base that is made of a low melt yarn having pile fibers extending outwardly therefrom.
Figure 2:
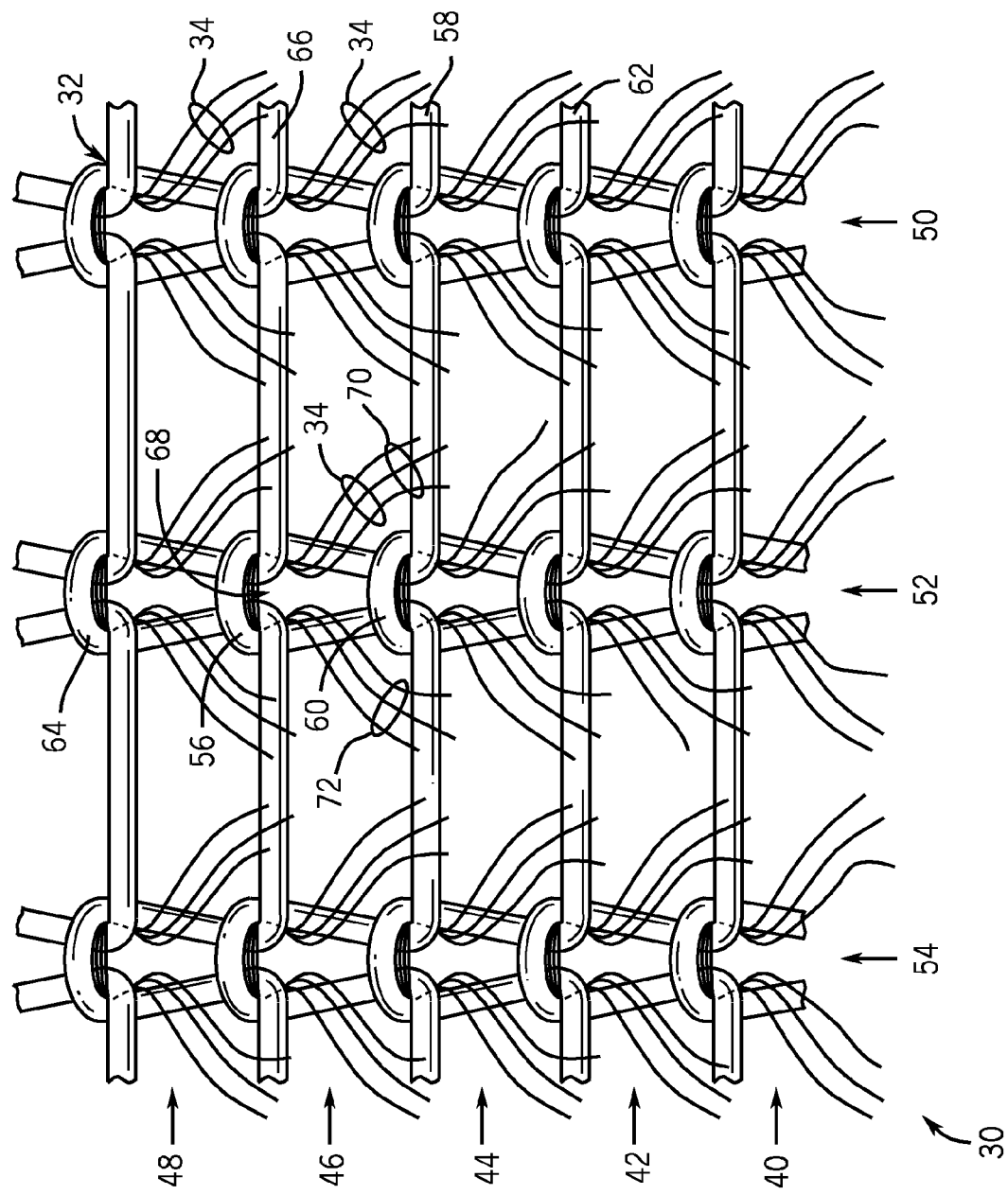
FIG. 2 is a schematic view of a portion of the tubular paint roller fabric illustrated in FIG. 1 from the outside, showing the knitting pattern of the base yarn and the placement of pile fibers from the sliver into the knit base.
Figure 3:
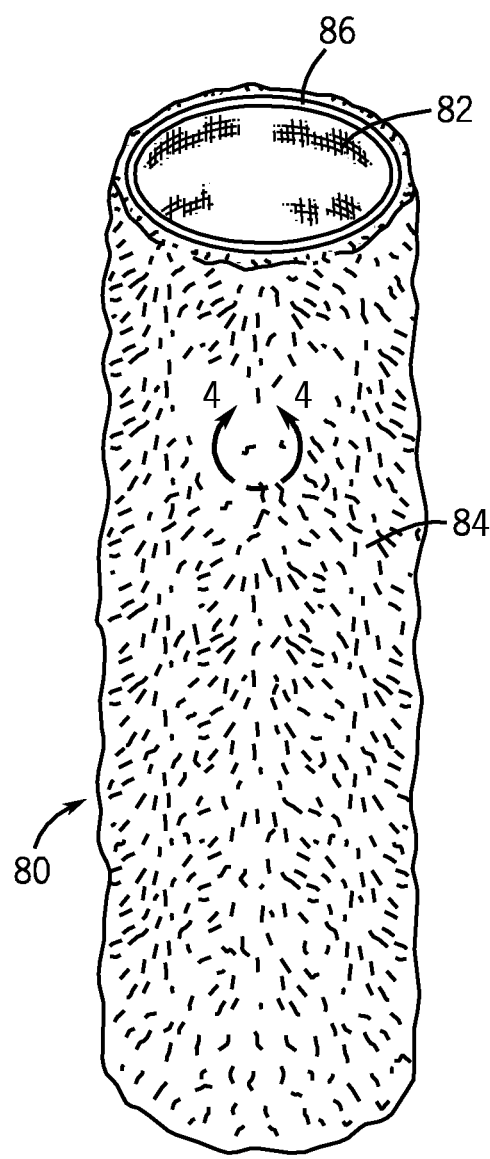
FIG. 3 is an isometric view of a segment of tubular cut pile knit paint roller fabric made according to the teachings of the present invention with the cut pile extending outwardly, showing a tubular knit base that is made of a low melt yarn having cut pile yarn segments extending outwardly therefrom.
Figure 4:
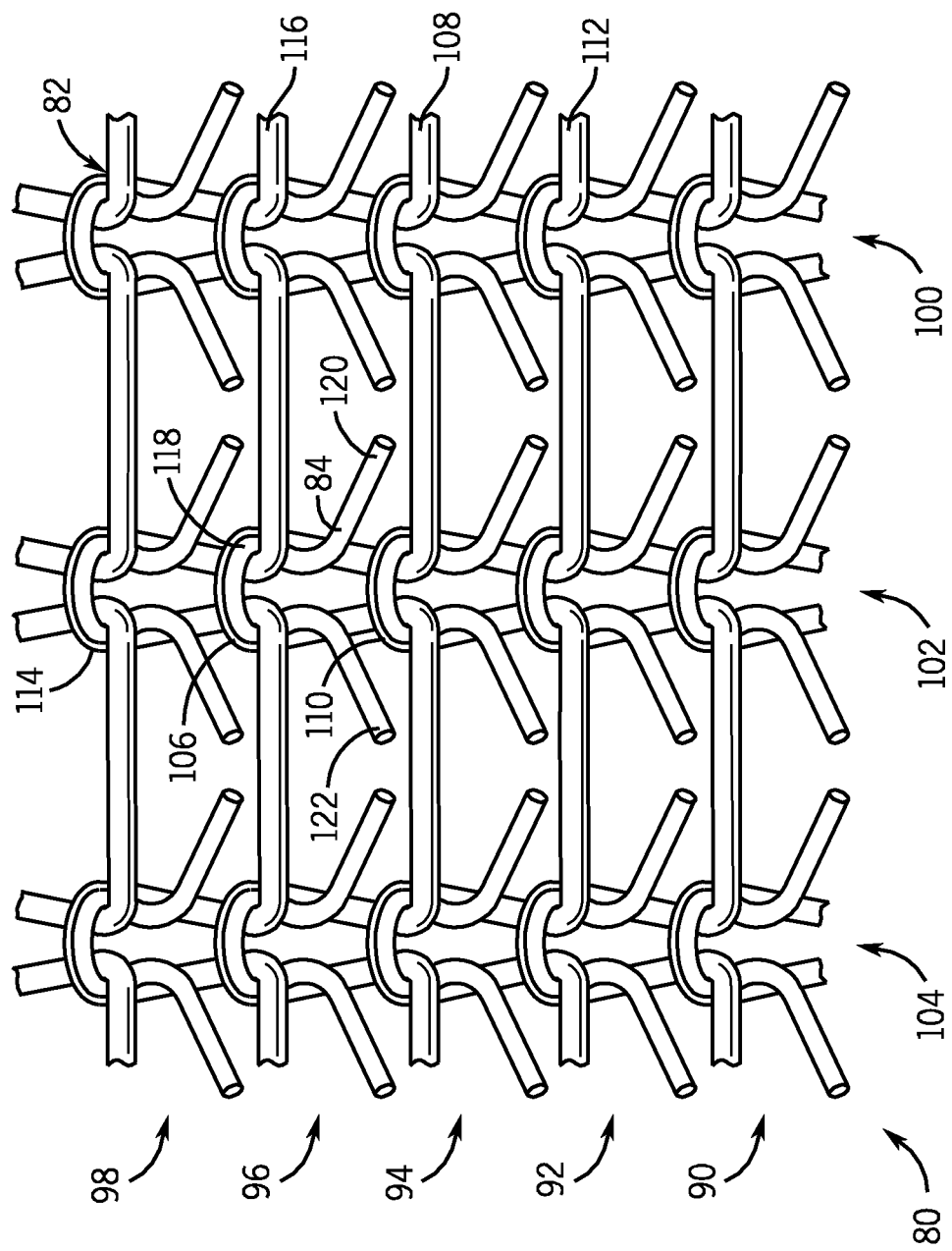
FIG. 4 is a schematic view of a portion of the tubular paint roller fabric illustrated in FIG. 1 from the outside, showing the knitting pattern of the base yarn and the placement of cut pile yarn segments into the knit base.

The paint roller cover manufacturing method of the present invention uses a tubular paint roller fabric that may be either a tubular knit base that is made of a low melt yarn having sliver pile fibers extending outwardly therefrom or a tubular knit base that is made of a low melt yarn having cut pile yarn segments extending outwardly therefrom. The former tubular paint roller fabric is discussed in detail in the above-incorporated by reference U.S. Pat. No. 7,503,191 and is shown in FIGS. 1 and 2 herein, and the latter tubular paint roller fabric is discussed in detail in the above-incorporated by reference U.S. Pat. No. 7,748,241 and is shown in FIGS. 3 and 4 herein.

Referring first to FIG. 1, a tubular sliver knit segment 30 that may be continuously knitted in an extended length is shown. The tubular sliver knit segment 30 consists of a knit backing or base material 32 having pile fibers 34 extending from the knit base material 32 on the outer surface of the tubular sliver knit segment 30. The knit base material 32 is made from a low melt yarn that will be discussed below. It may be seen from a top edge 36 of the knit base material 32 that the tubular sliver knit segment 30 has an essentially circular cross section. The tubular sliver knit segment 30 may be knitted in as long a length as desired, notwithstanding that FIG. 1 only shows a relatively short segment of the tubular sliver knit segment 30.

Referring next to FIG. 2, a segment of the tubular sliver knit segment 30 is shown in schematic form from the outside thereof to illustrate the knit of the knit base material 32, and the manner in which tufts of the pile fibers 34 are woven into the knit base material 32. Those skilled in the art will at once realize that while the tufts of the pile fibers 34 shown in FIG. 2 include only a few fibers each for added clarity and understanding of the construction of the pile fabric 30, tufts of the pile fibers 34 in the tubular sliver knit segment 30 will actually include sufficient pile fibers 34 to make a pile that is sufficiently dense for the intended use of the tubular sliver knit segment 30 in the manufacture of a paint roller cover.

The foundation of the tubular sliver knit segment 30 is the knit base material 32, which may be knit from a low melt yarn in a highly modified single jersey circular knitting process on a radically redesigned circular knitting machine. The knit base material 32 has a plurality of courses (which are rows of loops of stitches which run across the knit fabric), five of which are shown and designated by the reference numerals 40, 42, 44, 46, and 48, and a plurality of wales (which are vertical chains of loops in the longitudinal direction of the knit fabric), three of which are shown and designated by the reference numerals 50, 52, and 54. The respective courses 40, 42, 44, 46, and 48 are knitted sequentially from the lowest course number to the highest course number.

By way of example, the construction of the portion of the tubular sliver knit segment 30 in the area of the course 46 and the wale 52 will be discussed herein. A loop 56 formed in a yarn segment 58 is located in this area, with a loop 60 formed in a yarn segment 62 being located in the course 44 below the loop 56, and a loop 64 formed in a yarn segment 66 being located in the course 48 above the loop 56. The loop 56 extends through the loop 60 from the outside to the inside of the tubular sliver knit segment 30 (shown in FIG. 2), and the loop 64 also extends through the loop 56 from the outside to the inside.

A tuft of pile fibers 34 having a loop portion 68 and opposite end portions 70 and 72 is knitted into the knit base material 32 together with the loop 56. The loop portion 68 of that particular tuft of pile fibers 34 is located adjacent the top of the loop 56, and the opposite end portions 70 and 72 of that particular tuft of pile fibers 34 extend outwardly from the interior of the loop 56, above the loop 60 and below the loop 64. In a similar manner, each of the other tufts of the pile fibers 34 is knitted into the knit base material 32 with a different loop.

Referring now to FIG. 3, a tubular cut pile knit segment 80 that may be continuously knitted in an extended length is shown. The tubular cut pile knit segment 80 consists of a knit backing or base material 82 having cut pile segments 84 extending from the knit base material 82 on the outer surface of the tubular cut pile knit segment 80. The knit base material 82 is made from a low melt yarn that will be discussed below. It may be seen from a top edge 86 of the knit base material 82 that the tubular cut pile knit segment 80 has an essentially circular cross section. The tubular cut pile knit segment 80 may be knitted in as long a length as desired, notwithstanding that FIG. 3 only shows a relatively short segment of the tubular cut pile knit segment 80.

Referring next to FIG. 4, a segment of the tubular cut pile knit segment 80 is shown in schematic form from the outside thereof to illustrate the knit of the knit base material 82, and the manner in which the cut pile segments 84 are knitted into the knit base material 82.

The foundation of the tubular cut pile knit segment 80 is the knit base material 82, which may be knit from a low melt yarn in a highly modified single jersey circular knitting process on a radically redesigned circular knitting machine. The knit base material 82 has a plurality of courses (which are rows of loops of stitches which run across the knit fabric), five of which are shown and designated by the reference numerals 90, 92, 94, 96, and 98, and a plurality of wales (which are vertical chains of loops in the longitudinal direction of the knit fabric), three of which are shown and designated by the reference numerals 100, 102, and 104. The respective courses 90, 92, 94, 96, and 98 are knitted sequentially from the lowest course number to the highest course number.

By way of example, the construction of the portion of the tubular cut pile knit segment 80 in the area of the course 96 and the wale 102 will be discussed herein. A backing loop 106 formed in a backing yarn segment 108 is located in this area, with a backing loop 110 formed in a backing yarn segment 112 being located in the course 94 below the backing loop 106, and a backing loop 114 formed in a backing yarn segment 116 being located in the course 98 above the backing loop 106. The backing loop 106 extends through the backing loop 110 from the outside to the inside of the tubular cut pile knit segment 80 (shown in FIG. 4), and the backing loop 114 also extends through the backing loop 106 from the outside to the inside. It will at once be appreciated by those skilled in the art that this arrangement of backing loops in sequentially knitted courses is completely opposite to the way in which knit fabrics have been knitted on known circular knitting machines.

A cut pile segment 84 having a pile loop portion 118 and opposite pile ends 120 and 122 is knitted into the knit base material 82 together with the backing loop 106. The pile loop portion 118 of that particular cut pile segment 84 is located adjacent the top of the backing loop 106, and the opposite pile ends 120 and 122 of that particular cut pile segment 84 extend outwardly from the interior of the backing loop 106, above the backing loop 110 and below the backing loop 114. In a similar manner, each of the other cut pile segments 84 is knitted into the knit base material 82 with a different backing loop.

Referring now to FIGS. 5 through 9, a number of different bicomponent fibers are shown by way of example (although numerous alternatives may be manufactured by yarn producers), any of which could be used for the backing (the yarn segments 58, 62, and 66 shown in FIG. 2) of the tubular sliver knit segment 30 (shown in FIG. 1) or for the backing (the yarn segments 108, 112, and 116 shown in FIG. 4) of the tubular cut pile knit segment 80 (shown in FIG. 3). Referring first to FIG. 5, a sheath-core bicomponent fiber 130 is illustrated which has a high melt component 132 located in the center of the sheath-core bicomponent fiber 130 and a low melt component 134 located on the outer portion of the sheath-core bicomponent fiber 130 which low melt component 134 surrounds the high melt component 132. The segments of the low melt component 134 and the high melt component 132 are concentric.

Referring next to FIG. 6, a side-by-side bicomponent fiber 140 is illustrated which has one side (a semicircular cross section) made of a high melt component 142 and the other side (a complementary semicircular cross section) made of a low melt component 144. Referring now to FIG. 7, an eccentric sheath-core bicomponent fiber 150 is illustrated which has a high melt component 152 located in the center of the eccentric sheath-core bicomponent fiber 150 and a low melt component 154 located on the outer portion of the eccentric sheath-core bicomponent fiber 150 which low melt component 154 surrounds the high melt material 152. By definition in an eccentric sheath-core relationship, the segments of the low melt component 154 and the high melt component 152 are not concentric.

Referring next to FIG. 8, a matrix-fibril bicomponent fiber 160 is illustrated which has four segments of high melt component 162 distributed in a matrix of low melt component 164 that entirely surrounds the segments of high melt component 162. Although four segments of high melt component 162 are shown in FIG. 8, more or fewer could be used. Also, although the four segments of high melt component 162 are shown as being evenly distributed in the surrounding low melt component 164, the segments of high melt component 162 could be distributed more randomly in the surrounding low melt component 164 as well.

Referring now to FIG. 9, a segmented pie bicomponent fiber 170 is illustrated which has eight pie-shaped segments that are evenly distributed around the circumference of the segmented pie bicomponent fiber 170. The segments alternate between high components 172 and low melt components 174. Although four segments of high melt component 172 and four segments of low melt component 174 are shown in FIG. 9, more or fewer could be used.

Referring next to FIG. 10, a bicomponent yarn 180 is illustrated which is made up of four fibers, two of which are high melt fibers 182 and two of which are low melt fibers 184. As is the case with any yarn, the high melt fibers 182 and the low melt fibers 184 are twisted together to form the segment of bicomponent yarn 180. Although two high melt fibers 182 and two low melt fibers 184 are shown in FIG. 10, more or fewer of each could be used.

Referring now to FIGS. 11 and 12, a mandrel heating assembly 190 is illustrated in two cross sectional views. The mandrel heating assembly 190 of the exemplary embodiment has a mandrel 192 that is cylindrical and has an outer diameter of approximately one and three-eighths inches (35 millimeters) or slightly less and has a coaxial cylindrical aperture 194 located therein that is approximately three-quarters of an inch (19 millimeters) in diameter or slightly larger extending therethrough, which mandrel 192 may be made out of steel. A smaller aperture 196 that is approximately one-eighth of an inch (3.2 millimeters) is diameter or slightly larger extends longitudinally through the mandrel 192 and is located in the mandrel 192 between the aperture 194 and the outer surface of the mandrel 192.

A cartridge heater 198 is located in the aperture 194 in the mandrel 192. The cartridge heater 198 may be a Watlow FIREROD Part No. N24A23-E12H cartridge heater from Watlow Electric Manufacturing Company of St. Louis, Mo. The cartridge heater 198 has a three-quarter inch (19 millimeter) diameter and is twenty-four inches (610 millimeters) long, has a 2750 Watt rating, and has two heater leads 200 extending from one end thereof.

A thermocouple 202 is located in the aperture 196 in the mandrel 192. The thermocouple 202 may be an Omega Model No. JMQSS-125G-6 thermocouple from Omega Engineering, Inc. of Stamford, Conn. The thermocouple 202 has a has an one-eighth inch (3.2 millimeter) diameter, is twenty-four inches (610 millimeters) long, and has two thermocouple leads 204 extending from one end thereof.

Referring next to FIG. 13, a control circuit for operating the cartridge heater 198 based on temperature information received from the thermocouple 202 is illustrated. A Eurotherm Model No. 2216e general purpose PID (Proportional-Integral-Derivative) temperature controller from Eurotherm Inc. of Leesburg, Va. has as an input the thermocouple leads 204 from the thermocouple 202, and is connected through the heater leads 200 to operate the cartridge heater 198 at the desired temperature.

Referring next to FIG. 14, a tubular knitted pile fabric 220 (which may be either the tubular sliver knit segment 30 or the tubular cut pile knit segment 80) having a first end 222 and a second end 224 is shown as it is about to be pulled onto the exterior surface of a hollow cylindrical aluminum heating tube 226 having a first end 228 and a second end 230 and a nonstick substance 232 on the outer surface thereof. The aluminum heating tube 226 has an outer diameter that is approximately the same as the inner diameter of a finished paint roller cover core (paint roller cover cores typically have an inner diameter of approximately one and one-half inches (38 millimeters), although alternative sizes such as inner diameters of one and three-quarters inches (44 millimeters) and two inches (51 millimeters) can be manufactured as well).

The aluminum heating tube 226 has an inner diameter of approximately one and three-eighths inches (35 millimeters) or slightly greater and is sized to fit removably over the mandrel 192 of the mandrel heating assembly 190 (shown in FIGS. 11 and 12). (It should be noted that the inner diameter of the aluminum heating tube 226 is not critical, and indeed will vary according to the outer diameter of the mandrel 192 of the mandrel heating assembly 190.) The outer surface of the aluminum heating tube 226 is coated with a low coefficient of friction material such as silicone or polytetrafluoroethylene (PTFE, such as the material marketed by DuPont under the trademark TEFLON) to provide a non-stick substance 232 thereupon.

The tubular knitted pile fabric 220 has an inner diameter that is approximately the same size as or slightly smaller than the outer diameter of the aluminum heating tube 226. The tubular knitted pile fabric 220 may be sized to require that it be stretched slightly when it is placed onto the aluminum heating tube 226 in order to achieve the correct density and/or positioning. Alternately, the tubular knitted pile fabric segment 220 could also be slightly larger than the outer diameter of the aluminum heating tube 226 and shrunk slightly (through the subsequent application of heat which will be discussed below) to closely conform to the aluminum heating tube 226.

The tubular knitted pile fabric 220 is of a length that corresponds to the desired length of a paint roller cover. For a nine inch (229 millimeters) long paint roller cover, the tubular knitted pile fabric 220 will have to be sufficiently long such that following the application of heat the resulting paint roller cover will be of the desired length. Experience has indicated that there may be shrinkage in length during the application of heat (in one instance, the shrinkage in length was approximately eight percent. Accordingly, if an eight percent shrinkage in length is anticipated, the tubular knitted pile fabric 220 will need to be approximately 9.8 inches (249 millimeters) long.

It will be appreciated by those skilled in the art that the tubular knitted pile fabric 220 could alternately be sized for use in manufacturing a plurality of paint roller covers of any of several different lengths. For example, the tubular knitted pile fabric 220 could be approximately one hundred inches (2.54 meters) long, which is a sufficient length to allow it to be used for the manufacture of seven nine inch (229 millimeter) long paint roller covers. In this case, of course, the aluminum heating tube 226 and the mandrel heating assembly 190 (shown in FIGS. 11 and 12) would have to be proportionately longer as well.

In FIG. 14, the tubular knitted pile fabric 220 is shown with its second end 224 about to be pulled over the first end 228 of the aluminum heating tube 226. FIG. 15 shows the tubular knitted pile fabric 220 partly pulled onto the aluminum heating tube 226, and FIG. 16 shows the tubular knitted pile fabric 220 fully pulled onto the aluminum heating tube 226, with the second end 224 of the tubular knitted pile fabric 220 located close adjacent to the second end 230 of the aluminum heating tube 226. The tubular knitted pile fabric 220 fits easily on the outer diameter of the aluminum heating tube 226, and is not stretched on the aluminum heating tube 226.

Referring next to FIG. 17, the aluminum heating tube 226 with the tubular knitted pile fabric 220 located thereupon is about to be placed onto the mandrel heating assembly 190. As mentioned above, the inside diameter of the aluminum heating tube 226 is sized to fit removably over the outer diameter of the mandrel 192 of the mandrel heating assembly 190, but with a relatively close fit to allow heat from the mandrel heating assembly 190 to be transferred to and through the aluminum heating tube 226. Prior to placing 226 with the tubular knitted pile fabric 220 located thereupon over the mandrel heating assembly 190, the mandrel heating assembly 190 is brought up to the desired temperature. Typically, this will take less than one minute.

The temperature of the mandrel heating assembly 190 is a function of which particular bicomponent material is used in the low melt yarn used for the backing of the tubular knitted pile fabric 220. More specifically, the temperature used must be at or above the melting point of the low melt component used in the backing material, but below the melting point of the high melt component used in the backing material and preferably below the melting point of the material(s) used in the pile of the tubular knitted pile fabric 220. The temperature of the mandrel heating assembly 190 accordingly varies according to the properties of the bicomponent material, and will typically be set between approximately 375 degrees Fahrenheit (190 degrees Celsius) and approximately 435 degrees Fahrenheit (224 degrees Celsius), although with some bicomponent materials the temperature may vary from as low as approximately 250 degrees Fahrenheit (121 degrees Celsius) to as high as 600 degrees Fahrenheit (316 degrees Celsius).

In FIG. 17, the aluminum heating tube 226 with the tubular knitted pile fabric 220 located thereupon is shown with the second end 230 of the aluminum heating tube 226 about to be pulled over the mandrel heating assembly 190. FIG. 18 shows the aluminum heating tube 226 with the tubular knitted pile fabric 220 located thereupon fully pulled onto the mandrel heating assembly 190, where it is heated and maintained for a period of time sufficient to activate the backing yarn. (Activating the backing yarn constitutes melting the low melt component of the bicomponent material of the backing yarn of the tubular knitted pile fabric 220 so that it will flow together to lock the backing yarn into an integral cylindrical core around the aluminum heating tube 226.)

This period of time can vary between approximately five seconds to approximately ninety seconds, with typical times for most bicomponent materials varying from approximately five seconds to approximately sixty seconds. During this activation process, the length of the tubular knitted pile fabric 220 may shrink somewhat, as mentioned above. Clamps securing the fabric in place (not shown herein) can be utilized to minimizing or eliminate the fabric's shrinking characteristics. Following the activation process, the aluminum heating tube 226 with the now-activated tubular knitted pile fabric 240 located thereupon is removed from the mandrel heating assembly 190 and allowed to cool, which typically takes only a few seconds. The activated tubular knitted pile fabric 240 (shown in FIG. 19) may then be removed from the aluminum heating tube 226.

Referring next to FIG. 19, the activated tubular knitted pile fabric 240 is shown as having a first end 242 and a second end 244, with a pile 248 extending outwardly from the activated tubular knitted pile fabric 240. The inside of the activated tubular knitted pile fabric 240 is a cylindrical fused backing 246. Finishing the activated tubular knitted pile fabric 240 will include the steps of combing the pile 248 of the activated tubular knitted pile fabric 240 and shearing it to the desired length. Finally, the ends 242 and 244 of the activated tubular knitted pile fabric 240 may be finished and the edges of the activated tubular knitted pile fabric 240 may be beveled, and any loose fibers may be vacuumed off.

While the exemplary embodiment discussed above produces a nine inch (229 millimeter) paint roller cover, the tubular knitted pile fabric 220, the aluminum heating tube 226, and the mandrel heating assembly 190 (al shown in FIGS. 17 and 18) could alternately be sized for use in manufacturing a plurality of paint roller covers of any of several different lengths. For example, a substantially longer activated tubular knitted pile fabric 240 could be produced and subsequently be cut into unfinished paint roller cover segments of any desired size. These unfinished paint roller cover segments would then be finished as described above.

Figure 20:
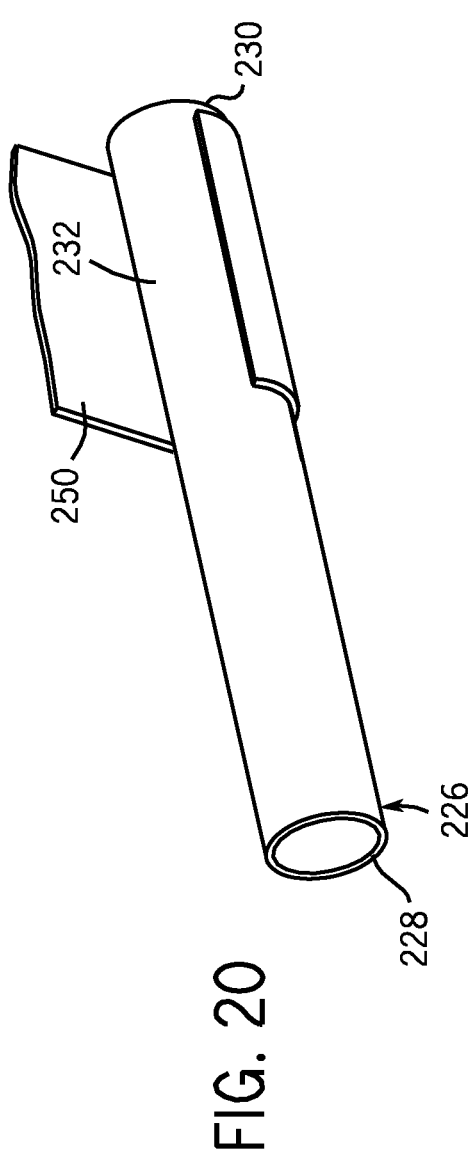
FIG. 20 is a schematic isometric depiction showing a wide segment of dry adhesive film beginning to be wound around the outer non-stick surface of the aluminum heating tube.
Figure 21:
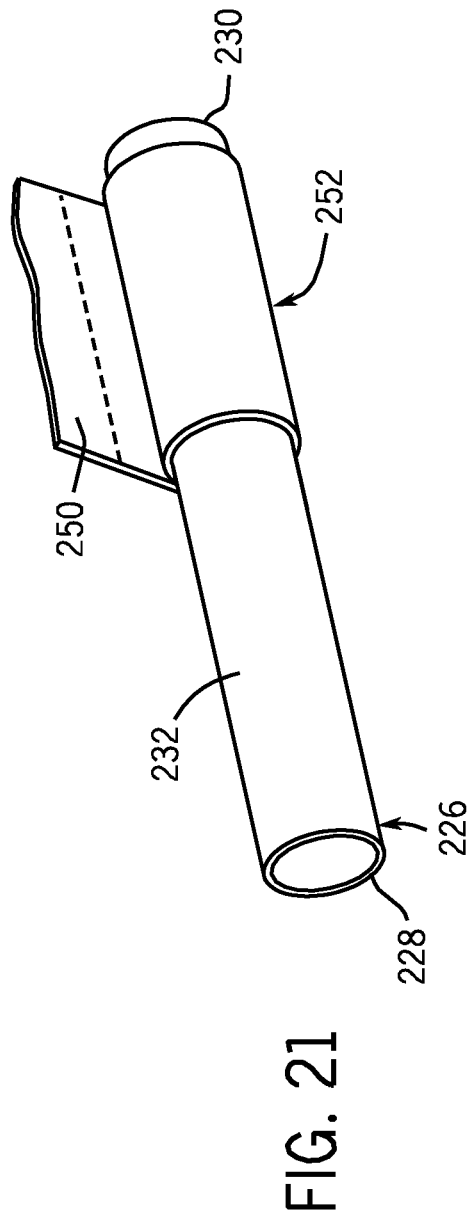
FIG. 21 is a schematic isometric depiction showing one or more windings of dry adhesive film on the aluminum heating tube shown in FIG. 20.

An alternate embodiment of the paint roller cover manufacturing method of the present invention is shown in FIGS. 20 through 24. Referring first to FIG. 20, one or more layers of dry adhesive film 250 is wound around the aluminum heating tube 226. The dry adhesive film 250 generally consists of a thin plastic film that is coated on one side (the side that will be wound facing outwardly) with a non-tacky adhesive, and may optionally have a pressure-sensitive adhesive on the opposite side to facilitate the installation of the dry adhesive film 250 onto the aluminum heating tube 226. One dry adhesive film that may be used, for example, is Stock No. 233 from Lenderink Technologies in Belmont, Mich. The thickness of the dry adhesive film 250 may vary from approximately 0.0005 inches (0.0127 millimeters) thick to approximately 0.01 inches (0.254 millimeters) thick. For example, from one to seven layers of 0.0012 inch (0.0305 millimeter) thick dry adhesive film 250, or from one to three layers of thicker dry adhesive film 250 (0.0024 inch (0.61 millimeter) thick to 0.0072 inch (0.183 millimeter) thick) being used. The dry adhesive film 250 is cut when a sufficient length of the dry adhesive film 250 has been wound around the aluminum heating tube 226 to form a wrapped dry adhesive film 252, as shown in FIG. 21.

Referring next to FIG. 22, the tubular knitted pile fabric 220 is shown with its second end 224 about to be pulled over the first end 228 of the aluminum heating tube 226, and then onto the wrapped dry adhesive film 252 on the aluminum heating tube 226. FIG. 23 shows the tubular knitted pile fabric 220 fully pulled onto the wrapped dry adhesive film 252 on the aluminum heating tube 226, with the aluminum heating tube 226 with the tubular knitted pile fabric 220 and the wrapped dry adhesive film 252 located thereupon about to be placed over the mandrel heating assembly 190.

FIG. 24 shows the aluminum heating tube 226 with the tubular knitted pile fabric 220 and the wrapped dry adhesive film 252 located thereupon fully pulled onto the mandrel heating assembly 190, where it is heated and maintained for a period of time sufficient to activate the wrapped dry adhesive film 252 and the backing yarn, with the wrapped dry adhesive film 252 and the low melt component of the bicomponent material of the backing yarn of the tubular knitted pile fabric 220 flowing together to form an integral cylindrical core around the mandrel 192 of the mandrel heating assembly 190. Following the activation process, the aluminum heating tube 226 with the now-fused together material is removed from the mandrel heating assembly 190 and allowed to cool. The resulting assembly may then be removed from the aluminum heating tube 226 and finished as described above.

Figure 25:
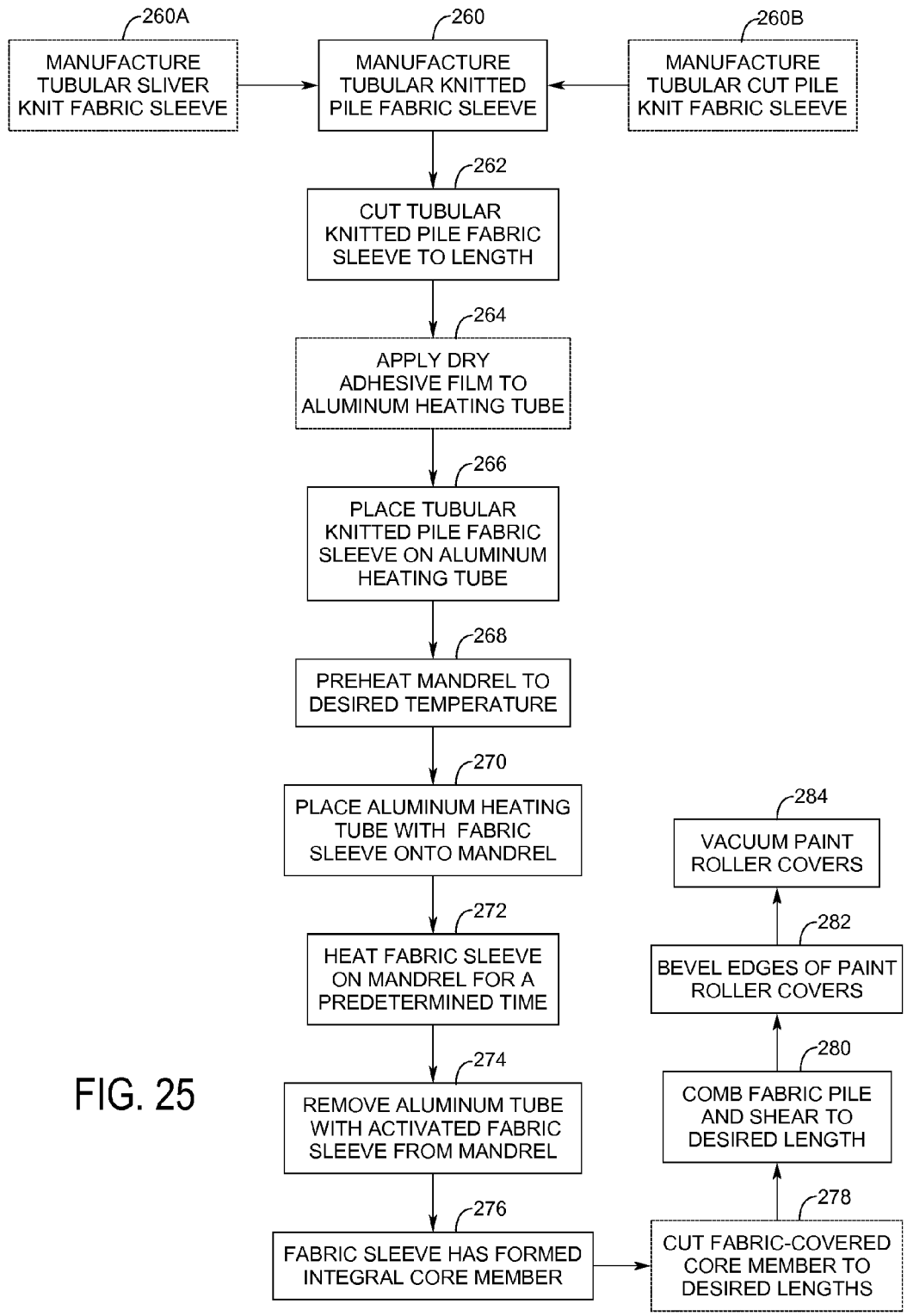
FIG. 25 is a flow diagram showing the manufacturing of a paint roller cover that is made according to the teachings of the present invention, with a number of the steps being those illustrated in FIGS. 1 through 24.

Referring finally to FIG. 25, the paint roller cover manufacturing method of the present invention is shown in a flow chart that includes a number of the variations discussed herein. The paint roller cover manufacturing operation starts in a manufacture tubular knitted pile fabric sleeve step 260 in which the tubular knitted pile fabric used in the tubular knitted pile fabric 220 (shown in FIGS. 14 through 18) is manufactured. This is done in one of at least two different manners.

A first manner of the manufacturing the tubular knitted pile fabric used in the tubular knitted pile fabric 220 (shown in FIGS. 14 through 18) is represented in a manufacture tubular sliver knit fabric sleeve 260A, which corresponds to manufacture of the tubular sliver knit segment 30 shown in FIGS. 1 and 2. A second manner of the manufacturing the tubular knitted pile fabric used in the tubular knitted pile fabric 220 is represented in a manufacture tubular cut pile knit fabric sleeve 260B, which corresponds to manufacture of the tubular cut pile knit segment 80 shown in FIGS. 3 and 4.

The process next moves to a cut tubular knitted pile fabric sleeve to length step 262 in which the tubular knitted pile fabric is cut to the desired length of the tubular knitted pile fabric 220 (shown in FIGS. 14 through 18). As mentioned above, the tubular knitted pile fabric 220 will have to be sufficiently long such that following the application of heat the resulting paint roller cover will be of the desired length, taking account of shrinkage that may occur during the heating process. Alternately, the tubular knitted pile fabric 220 could be sized for use in manufacturing a plurality of paint roller covers of any of several different lengths. For example, a substantially longer activated tubular knitted pile fabric 240 (shown in FIG. 19) could be produced and subsequently be cut into unfinished paint roller cover segments of any desired size.

Optionally, an apply dry adhesive film to aluminum heating tube step 264 can then be used if it is desired to apply the wrapped dry adhesive film 252 (shown in FIG. 22) under the tubular knitted pile fabric 220 on the aluminum heating tube 226.

With or without the apply dry adhesive film to aluminum heating tube step 264, the tubular knitted pile fabric 220 is placed onto the aluminum heating tube 226 in a place tubular knitted pile fabric sleeve on aluminum tube step 266, as shown in FIGS. 14 through 16 (without the wrapped dry adhesive film 252) or in FIG. 22 (with the wrapped dry adhesive film 252). The process next moves to a preheat mandrel to desired temperature step 268, wherein the mandrel heating assembly 190 is heated to the desired temperature to activate the low melt component in the backing of the tubular knitted pile fabric 220.

The process then moves to a place aluminum heating tube with fabric sleeve onto mandrel step 270, in which the aluminum heating tube 226 with the tubular knitted pile fabric 220 (and, optionally, the wrapped dry adhesive film 252) located thereupon is placed onto the mandrel heating assembly 190 to initiate the heating process, as shown in FIG. 17. The aluminum heating tube 226 with the tubular knitted pile fabric 220 (and, optionally, the wrapped dry adhesive film 252) located thereupon is heated on the mandrel heating assembly 190 for a predetermined time as shown in FIG. 18 in a heat fabric sleeve on mandrel for a predetermined time step 272.

The process then moves to a remove aluminum tube with activated fabric sleeve from mandrel step 274 in which the aluminum heating tube 226 with the activated tubular knitted pile fabric 240 (shown in FIG. 19) is removed from the mandrel heating assembly 190 and allowed to cool. At this point, the activated tubular knitted pile fabric 240 has cooled and has an integral cylindrical fused backing 246 located on the inside thereof, as indicated in a fabric sleeve has formed integral core member step 276.

Next, in an optional cut fabric-covered core member to desired lengths step 278, the activated tubular knitted pile fabric 240 may be cut into a plurality of unfinished paint roller covers of any desired size. This step is, of course, not performed if the tubular knitted pile fabric 220 was cut to meet its finished size in the cut tubular knitted pile fabric sleeve to length step 262. The unfinished paint roller covers may then have the fabric pile thereupon combed and sheared to a desired length in a comb and shear fabric pile step 280. It should be noted that the comb and shear fabric pile step 280 may instead be performed before the cut fabric-covered core member to desired lengths step 278.

Next, in a bevel edges of paint roller covers step 282, the edges of the unfinished paint roller covers are beveled to finish them. Finally, in a vacuum paint roller covers step 284, loose fibers are vacuumed off the unfinished paint roller covers, finishing them into paint roller covers which may then be packaged and sold (typically, vacuuming is accomplished throughout the brushing, shearing, and beveling steps rather than as a separate step).

It may therefore be appreciated from the above detailed description of the preferred embodiment of the present invention that it teaches a method by which a paint roller cover may be manufactured from tubular knitted pile fabric. Further, in practicing the paint roller cover manufacturing method of the present invention, the tubular knitted pile fabric need not be stretched, and no wrinkles or other surface defects are introduced into the tubular knitted pile fabric during the manufacturing process. Still further, the paint roller cover manufacturing method of the present invention, which manufactures the tubular knitted pile fabric with the pile side out, does not require the tubular knitted pile fabric to be inverted during the manufacturing process.

The paint roller cover manufacturing method of the present invention results in an acceptable pile which extends from an acceptably rigid core which can be installed on and used with any conventional paint roller frame, or on a frame uniquely designed for the paint roller utilizing the new core design. The paint roller cover manufacturing method of the present invention facilitates either the manufacture of a paint roller cover of a desired finished length, or the manufacture of an extended length segment from which segments of any desired size can be cut for finishing as paint roller covers, thereby facilitating the mass manufacture of paint roller covers. The paint roller cover manufacturing method of the present invention can use either tubular sliver knitted pile fabric or tubular knitted yarn cut pile fabric as well as a number of different backing materials.

The paint roller cover manufacturing method of the present invention results in a construction which is both durable and long lasting, and yields a paint roller cover of superior quality. The paint roller cover manufacturing method of the present invention also reduces the cost of manufacturing paint roller covers when compared to conventional methods of manufacturing paint roller covers by manufacturing paint rollers without using a core member, thereby affording it the broadest possible market. Finally, all of the aforesaid advantages and aspirations of the paint roller cover manufacturing method of the present invention are achieved without incurring any substantial relative disadvantage.

Although the foregoing description of the paint roller cover manufacturing method of the present invention has been shown and described with reference to particular embodiments and applications thereof, it has been presented for purposes of illustration and description and is not intended to be exhaustive or to limit the invention to the particular embodiments and applications disclosed. It will be apparent to those having ordinary skill in the art that a number of changes, modifications, variations, or alterations to the invention as described herein may be made, none of which depart from the spirit or scope of the present invention. The particular embodiments and applications were chosen and described to provide the best illustration of the principles of the invention and its practical application to thereby enable one of ordinary skill in the art to utilize the invention in various embodiments and with various modifications as are suited to the particular use contemplated. All such changes, modifications, variations, and alterations should therefore be seen as being within the scope of the present invention as determined by the appended claims when interpreted in accordance with the breadth to which they are fairly, legally, and equitably entitled.

What is claimed is:
1. A method of manufacturing a paint roller cover, comprising:
  providing a tubular knitted pile fabric sleeve having a first end and a second end, said tubular knitted pile fabric sleeve comprising:
    a base fabric having a tubular configuration defining an outside and an inside; and
    pile strands knitted into said base fabric and extending outwardly from said base fabric to form the pile of said tubular knitted pile fabric sleeve;
  said tubular knitted pile fabric sleeve being manufactured with said pile strands extending outwardly;
  placing a segment of film material onto a cylindrical outer surface of a cylindrical member;
  placing a first length of said tubular knitted pile fabric sleeve onto the cylindrical member with said inside of said base fabric in contact with said segment of film material on said cylindrical outer surface of said cylindrical member, said tubular knitted pile fabric sleeve thus being located over said segment of film material on said cylindrical outer surface of said cylindrical member;
  heating said cylindrical member to cause said segment of film material to melt at least in part and fuse with said base fabric to thereby create a cylindrical integral core member; and removing the cylindrical member from the inside of the tubular knitted pile fabric sleeve.

2. A method as defined in claim 1, wherein said tubular knitted pile fabric sleeve comprises:
a sliver knit tubular knitted pile fabric sleeve wherein said pile strands comprise tufts of sliver fibers.

3. A method as defined in claim 1, wherein said tubular knitted pile fabric sleeve comprises:
a knit tubular knitted cut pile fabric sleeve wherein said pile strands comprise cut pile segments.

4. A method as defined in claim 1, wherein said base fabric comprises at least one bicomponent fiber comprising:
a first bicomponent fiber material having a first melting point; and
a second bicomponent fiber material having a second melting point that is lower than said first melting point.

5. A method as defined in claim 1, wherein said base fabric comprises a bicomponent yarn comprising:
at least one fiber made of a first material having a first melting point; and
at least one fiber made of a second material having a second melting point that is lower than said first melting point.

6. A method as defined in claim 1, wherein said tubular knitted pile fabric sleeve and said cylindrical member are both substantially longer than the length of a paint roller cover.

7. A method as defined in claim 6, additionally comprising:
cutting said integral core member into a plurality of unfinished paint roller covers each covered with knitted pile fabric having pile extending outwardly therefrom and each having edges located at opposite ends thereof.

8. A method as defined in claim 1, wherein said tubular knitted pile fabric sleeve is of a length that is sufficiently long such that following said heating step said integral core member will be substantially the length needed to produce a paint roller cover of the desired length.

9. A method as defined in claim 1, wherein said cylindrical member comprises:
a hollow cylindrical aluminum heating tube optionally having a non-stick outer surface.

10. A method as defined in claim 9, wherein said aluminum heating tube has an outer diameter that is substantially identical to a desired inner diameter of a finished paint roller cover.

11. A method as defined in claim 9, wherein said heating step comprises:
placing the aluminum heating tube with the tubular knitted pile fabric sleeve and said segment of film material located thereupon onto a preheated mandrel heating assembly; and
after a predetermined period of time, removing said aluminum heating tube from said mandrel heating assembly and allowing said integral core member to cool.

12. A method as defined in claim 11, wherein said mandrel heating assembly is preheated to a temperature that is sufficient to cause said segment of film material to melt.

13. A method as defined in claim 12, wherein said mandrel heating assembly is preheated to a temperature of between approximately 375 degrees Fahrenheit (190 degrees Celsius) and approximately 435 degrees Fahrenheit (224 degrees Celsius).

14. A method as defined in claim 11, wherein said predetermined time is sufficient time for said segment of film material to melt and fuse with said base fabric.

15. A method as defined in claim 14, wherein said predetermined time is between approximately five seconds and approximately ninety seconds.

16. A method as defined in claim 1, wherein said segment of film material comprises:
a segment of dry adhesive film;
wherein said segment of dry adhesive film melts at least in part and fuses with said base fabric.

17. A method as defined in claim 16, wherein said dry adhesive film is between approximately 0.0005 inches (0.0127 millimeters) and 0.01 inches (0.254 millimeters) thick.

18. A method as defined in claim 17, wherein said dry adhesive film comprises:
a thin plastic film having a first side and a second side opposite said first side.

19. A method as defined in claim 18, wherein said thin plastic film is coated on said first side with a non-tacky adhesive, wherein said first side of said thin plastic film that is coated with said non-tacky adhesive faces outwardly when said segment of film material is placed onto said cylindrical outer surface of said cylindrical member.

20. A method as defined in claim 18, wherein said dry thin plastic film is coated on said second side with a pressure-sensitive adhesive, wherein said second side of said thin plastic film that is coated with said pressure-sensitive adhesive faces inwardly when said segment of film material is placed onto said cylindrical outer surface of said cylindrical member.

21. A method as defined in claim 1, wherein between one and three layers of said segment of film material are wound around said cylindrical outer surface of said cylindrical member.

22. A method as defined in claim 1, wherein said tubular knitted pile fabric sleeve has edges located at said first and second ends thereof, said method additionally comprising:
combing said pile of said tubular knitted pile fabric sleeve extending from said integral core member;
shearing said pile of said tubular knitted pile fabric sleeve extending from said integral core member to the desired length;
beveling said edges of said tubular knitted pile fabric sleeve extending from said integral core member; and
vacuuming said pile of said knitted pile fabric extending from said integral core member.

23. A method as defined in claim 1, additionally comprising:
cutting said tubular knitted pile fabric sleeve extending from said integral core member into a plurality of unfinished paint roller covers each of a desired length;
combing said pile of said knitted pile fabric on said unfinished paint roller covers;
shearing said pile of said knitted pile fabric on said unfinished paint roller covers to the desired length;
beveling said edges of said unfinished paint roller covers; and
vacuuming said pile of said unfinished paint roller covers.

24. A method of manufacturing a paint roller cover, comprising:
providing a tubular knitted pile fabric sleeve having a first end and a second end, said tubular knitted pile fabric sleeve comprising:
a base fabric having a tubular configuration defining an outside and an inside; and
pile strands knitted into said base fabric and extending outwardly from said base fabric to form the pile of said tubular knitted pile fabric sleeve;
placing a segment of film material onto a cylindrical outer surface of a heating tube;

placing a first length of said tubular knitted pile fabric sleeve over said segment of film material on said cylindrical outer surface of said cylindrical member;

preheating a mandrel heating assembly to a temperature that is sufficient to cause said segment of film material to melt;

placing the heating tube with the segment of film material and the tubular knitted pile fabric sleeve located thereupon onto the mandrel heating assembly to heat said segment of film material to cause at least a portion of said segment of film material to melt and fuse with said base fabric to thereby create a cylindrical integral core member;

removing said heating tube from said mandrel heating assembly and allowing said integral core member to cool, said cylindrical integral core member, when cooled, being sufficiently rigid to preserve its cylindrical configuration; and removing the heating tube from the tubular knitted pile fabric sleeve.

25. A method of manufacturing a paint roller cover, comprising:

providing a tubular uninverted knitted pile fabric sleeve comprising:
 a tubular knitted base fabric; and
 outwardly extending pile strands knitted into said base fabric;

placing said tubular knitted pile fabric sleeve onto a cylindrical member over a segment of film material on said cylindrical member;

heating said cylindrical member to cause said segment of film material to melt at least in part and fuse with said base fabric so that, when cooled, said tubular base fabric remains in a cylindrical configuration; and removing the cylindrical member from the tubular knitted pile fabric sleeve.

* * * * *